United States Patent
Wang et al.

(10) Patent No.: US 11,871,398 B2
(45) Date of Patent: Jan. 9, 2024

(54) METHOD FOR PROCESSING SCRAMBLING INFORMATION, TERMINAL, AND NETWORK APPARATUS

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Sen Wang, Beijing (CN); Jiqing Ni, Beijing (CN); Shuangfeng Han, Beijing (CN); Chih-Lin I, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 58 days.

(21) Appl. No.: 17/598,685

(22) PCT Filed: Mar. 27, 2020

(86) PCT No.: PCT/CN2020/081647
§ 371 (c)(1),
(2) Date: Sep. 27, 2021

(87) PCT Pub. No.: WO2020/200085
PCT Pub. Date: Oct. 8, 2020

(65) Prior Publication Data
US 2022/0201686 A1    Jun. 23, 2022

(30) Foreign Application Priority Data
Mar. 29, 2019 (CN) .......................... 201910251510.9

(51) Int. Cl.
*H04W 72/04* (2023.01)
*H04W 72/044* (2023.01)

(52) U.S. Cl.
CPC .............................. *H04W 72/0466* (2013.01)

(58) Field of Classification Search
CPC ............ H04B 7/0658; H04L 25/03866; H04L 5/0023; H04W 72/0466
See application file for complete search history.

(56) References Cited

U.S. PATENT DOCUMENTS

2018/0367358 A1    12/2018    Baligh
2019/0069284 A1    2/2019    Wang et al.
(Continued)

FOREIGN PATENT DOCUMENTS

CN    102573061 A    7/2012
CN    103312391 A    9/2013
(Continued)

OTHER PUBLICATIONS

"On the channel structure of msgA", Apr. 2019, Source: ZTE, Sanechips, 3GPP TSG RAN WGJ Meeting #96bis, RI-1903878, 10 pgs.
(Continued)

*Primary Examiner* — Mansour Oveissi
*Assistant Examiner* — David M Oveissi
(74) *Attorney, Agent, or Firm* — Cooper Legal Group, LLC

(57) ABSTRACT

Disclosed in embodiments of the present invention are a method for processing scrambling information, a terminal, and a network apparatus. The method comprises: a network apparatus determining first information, wherein the first information is associated with at least one piece of the following information: a transmission point, a multiple-input multiple-output (MIMO) data layer of the transmission
(Continued)

point, a code block transmitted from the transmission point, and a data channel and a preamble transmitted from the transmission point; and the network apparatus determining, at least on the basis of the first information, initialization information for scrambling.

20 Claims, 9 Drawing Sheets

(56) References Cited

U.S. PATENT DOCUMENTS

| | | | |
|---|---|---|---|
| 2019/0289584 | A1 | 9/2019 | Wang et al. |
| 2019/0387550 | A1* | 12/2019 | Pan .................. H04W 74/0833 |
| 2020/0099461 | A1 | 3/2020 | Chen et al. |
| 2022/0053567 | A1* | 2/2022 | Lei ..................... H04L 5/0048 |
| 2022/0095354 | A1* | 3/2022 | Kim .................... H04W 24/10 |

FOREIGN PATENT DOCUMENTS

| | | |
|---|---|---|
| CN | 103687042 A | 3/2014 |
| CN | 105187098 B | 6/2018 |
| CN | 108650001 A | 10/2018 |
| CN | 108988978 A | 12/2018 |
| WO | 2018222224 A1 | 12/2018 |

OTHER PUBLICATIONS

"Physical Channels and Modulation", Dec. 2012, 3rd Generation Partnership Project; Technical Specification Group Radio Access Network,NR, (Release 15), 92 pgs.

International Search Report in the international application No. PCT/CN2020/081647, dated Jun. 9, 2020, 3 pgs.

English translation of the Written Opinion of the International Search Authority in the international application No. PCT/CN2020/081647, dated Jun. 9, 2020, 5 pgs.

"Further Details on Scrambling", May 2017, Source: Ericsson, 3GPP TSG-RAN WG1 Meeting #89, R1-1708940, Hangzhou, China, 2 pgs.

"Scrambling for Data Channels", Oct. 2017, Source: Ericsson, 3GPP TSG-RAN WG1 #90bis, R1-1718428, Prague, Czech Republic, 3 pgs.

"RNTIs and Contention Resolution for 2-step RA", Apr. 2019, Source: Ericsson, 3GPP TSG-RAN WG2 #105bis, TDoc R2-1903429, Xi'an, China, 5 pgs.

Supplementary European Search Report in the European application No. 20785297.1, dated Apr. 19, 2022, 10 pgs.

\* cited by examiner

METHOD FOR PROCESSING SCRAMBLING INFORMATION, TERMINAL, AND NETWORK APPARATUS

CROSS-REFERENCE TO RELATED APPLICATION

The present application is based upon and claims priority to Chinese Patent Application No. 201910251510.9, filed on Mar. 29, 2019, the disclosure of which is hereby incorporated by reference in its entirety.

TECHNICAL FIELD

The present application relates to the technical field of wireless communication, and in particular to a scrambling information processing method, a terminal, and a network device.

BACKGROUND

For a terminal user, scrambling sequences from Physical Downlink Shared Channels (PDSCH) of different Transmission Points (TRPs) of the same cell are the same, which results in a constant interference between Multiple-Input Multiple-Output (MIMO) data streams from the different TRPs.

In addition, for a two-step random access scheme, msg1 and msg3 in the existing four-step random access scheme are commonly referred to as one-step information MSG A. A terminal sends a random access preamble and a Physical Uplink Shared Channel (PUSCH) in MSG A, and there is no specific solution at present to improve the detection or demodulation performance under different terminal PUSCH collisions.

SUMMARY

Embodiments of the present application provide a scrambling information processing method, a terminal, and a network device.

In order to achieve the above object, the technical solutions of the embodiments of the present application are implemented as follows.

According to a first aspect, the embodiments of the present application provide a scrambling information processing method. The method may include that: a network device determines first information that is associated with at least one of the following information: a transmission point, an MIMO data layer of the transmission point, a codeword transmitted by the transmission point, a data channel transmitted by the transmission point, and a preamble; and the network device determines initialization information for scrambling at least based on the first information.

In some alternative embodiments of the present application, the method may further include that: the network device scrambles a PDSCH based on the initialization information; and the network device sends the scrambled PDSCH to a terminal based on the initialization information.

In some alternative embodiments of the present application, the initialization information may be represented by a polynomial form of weighted sums of different powers of 2.

The Initialization Information May Satisfy:

$$c_{init} = n_{N-1} \cdot 2^{N-1} + n_{N-2} \cdot 2^{N-2} + \cdots + n_0 \cdot 2^0 = \sum_{i=1}^{N} n_{i-1} \cdot 2^{i-1}$$

where $n_{i-1} \in \{0, 1, \ldots, Q_{i-1}\}$, $Q_{i-1}$ is a positive integer, and $n_{i-1}$ takes a value from a set consisting of hexadecimal numbers, decimal numbers, octal numbers, or binary numbers; specific values of Q corresponding to different i are the same or different; system representations of Q corresponding to different i are the same or different; and $N \in Z^+$ represents that a value is taken from a set of positive integers.

In some alternative embodiments of the present application, the first information may be an MIMO data layer index.

The operation that the network device determines the initialization information for scrambling at least based on the first information may include that: the network device determines initialization information for scrambling based on a first parameter, a codeword index, an MIMO data layer index, and a second parameter. The first parameter corresponds to a Radio Network Temporary Identity (RNTI) associated with PDSCH transmission, and the second parameter is a specific value.

In some alternative embodiments of the present application, the initialization information may satisfy:

$$c_{init} = n_{RNTI} 2^{15} + q \cdot 2^{14} + l \cdot 2^{13} + n_{ID},$$

where $c_{init}$ represents initialization information; $n_{RNTI}$ corresponds to an RNTI associated with PDSCH transmission; q represents a codeword index; l represents an MIMO data layer index; a value of $n_{ID}$ is within a first preset value range under a condition of satisfying a first preset condition, and corresponds to a cell identifier under a condition of not satisfying the first preset condition; and a maximum value within the first preset value range is 1023.

In some alternative embodiments of the present application, the first information may be a second parameter having a value within a second preset value range, and a maximum value within the second preset value range may be a positive integer greater than 1023.

The operation that the network device determines the initialization information for scrambling at least based on the first information may include that: the network device determines initialization information for scrambling based on a first parameter, a codeword index, and a second parameter. The first parameter corresponds to an RNTI associated with PDSCH transmission.

In some alternative embodiments of the present application, the initialization information may satisfy:

$$c_{init} = n_{RNTI} 2^{15} + q \cdot 2^{14} + n_{ID}$$

where $c_{init}$ represents initialization information; $n_{RNTI}$ corresponds to an RNTI associated with PDSCH transmission; q represents a codeword index; and a value of $n_{ID}$ is within the second preset value range under a condition of satisfying a first preset condition, and corresponds to a cell identifier under a condition of not satisfying the first preset condition.

In some alternative embodiments of the present application, the method may further include the following operations.

The network device scrambles a downlink Demodulation Reference Signal (DM-RS) based on the initialization information.

The network device sends the scrambled downlink DM-RS to a terminal based on the initialization information.

In some alternative embodiments of the present application, the first information may be an MIMO data layer index. The operation that the network device determines initialization information for scrambling based at least on the first information may include that: the network device determines initialization information for scrambling based on a third parameter and the MIMO data layer index. The third parameter includes the number of slots in one frame for transmitting a downlink DM-RS and/or the number of OFDM symbols in a slot for transmitting a downlink DM-RS.

In some alternative embodiments of the present application, the initialization information may satisfy:

$$c_{init}=(2^{17}(N_{symb}^{slot}n_{s,f}^{\mu}+l+1)(2N_{ID}^{nSCID}+1)+ 2^qN_{layer\text{-}ID}+2N_{ID}^{nSCID}+n_{SCID}) \bmod 2^{31}$$

where $c_{init}$ represents initialization information; 1 represents the number of OFDM symbols in a slot for transmitting a downlink DM-RS; $n_{s,f}^{\mu}$ represents the number of slots in one frame for transmitting a downlink DM-RS; $N_{layer\text{-}ID}$ represents an MIMO data layer index or a codeword identifier or a data channel index transmitted from the transmission point; $n_{SCID}$ represents a scrambling identifier; $N_{symb}^{slot}$ represents the number of symbols in one slot; and a value of $N_{ID}^{nSCID}$ is within a third preset value range under a condition of satisfying a second preset condition, and corresponds to a cell identifier under a condition of not satisfying the second preset condition.

In some alternative embodiments of the present application, the method may further include that: the network device receives a PUSCH transmitted by a terminal; and the network device descrambles the PUSCH based on the initialization information.

In some alternative embodiments of the present application, the first information may be a preamble index.

The operation that the network device determines initialization information for scrambling based at least on the first information may include that: the network device determines initialization information for scrambling based on a fourth parameter, a second parameter, and the preamble index. The fourth parameter corresponds to an RNTI associated with PUSCH transmission, and the second parameter is a specific value.

In some alternative embodiments of the present application, the initialization information may satisfy:

$$c_{init}=n_{RNTI}\cdot 2^{15}+n_{ID}\cdot 2^{10}+n_{preamble\text{-}ID},$$

or satisfies: $c_{init}=n_{RNTI}\cdot 2^{15}+n_{ID}\cdot 2^{14}+n_{preamble\text{-}ID},$ or satisfies: $c_{init}=n_{RNTI}\cdot 2^{15}+n_{preamble\text{-}ID}\cdot 2^{14}+n_{ID},$ or satisfies: $c_{init}=n_{RNTI}\cdot 2^{15}+n_{preamble\text{-}ID}\cdot 2^{10}+n_{ID},$ where $c_{init}$ represents initialization information; $n_{RNTI}$ corresponds to an RNTI associated with PUSCH transmission; $n_{preamble\text{-}ID}$ represents a preamble index; a value of nm is within a first preset value range under a condition of satisfying a first preset condition, and corresponds to a cell identifier under a condition of not satisfying the first preset condition; and a maximum value within the first preset value range is 1023.

In some alternative embodiments of the present application, the method may further include that: the network device receives an uplink DM-RS transmitted by a terminal; and the network device descrambles the uplink DM-RS based on the initialization information.

In some alternative embodiments of the present application, the first information may be a preamble index.

The operation that the network device determines initialization information for scrambling based at least on the first information may include that: the network device determines initialization information for scrambling based on a fifth parameter and the preamble index. The fifth parameter includes the number of slots in one frame for transmitting an uplink DM-RS and/or the number of OFDM symbols in a slot for transmitting an uplink DM-RS.

In some alternative embodiments of the present application, the initialization information may satisfy:

$$c_{init}=(2^{17}(N_{symb}^{slot}n_{s,f}^{\mu}+l+1)(2N_{ID}^{nSCID}+1)+ 2^qN_{layer\text{-}ID}+2N_{ID}^{nSCID}+n_{SCID}) \bmod 2^{31}$$

where $c_{init}$ represents initialization information; 1 represents the number of OFDM symbols in a slot for transmitting an uplink DM-RS; $n_{s,f}^{\mu}$ represents the number of slots in one frame for transmitting an uplink DM-RS; $N_{preamble\text{-}ID}$ represents a preamble index; $n_{SCID}$ represents a scrambling identifier; $N_{symb}^{slot}$ represents the number of symbols in one slot; and a value of $N_{ID}^{nSCID}$ is within a third preset value range under a condition of satisfying a third preset condition, and corresponds to a cell identifier under a condition of not satisfying the third preset condition.

According to a second aspect, the embodiments of the present application also provide a scrambling information processing method. The method may include that: a terminal obtains first information configured by a network device, the first information being associated with at least one of the following information: a transmission point, an MIMO data layer of the transmission point, a codeword transmitted by the transmission point, a data channel transmitted by the transmission point, and a preamble; and the terminal determines initialization information for scrambling at least based on the first information.

In some alternative embodiments of the present application, the method may further include that: the terminal receives a PDSCH sent by the network device, and descrambles the PDSCH based on the initialization information.

In some alternative embodiments of the present application, the initialization information may be represented by a polynomial form of weighted sums of different powers of 2.

The Initialization Information May Satisfy:

$$c_{init}=n_{N-1}\cdot 2^{N-1}+n_{N-2}\cdot 2^{N-2}+\cdots+n_0\cdot 2^0=\sum_{i=1}^{N}n_{i-1}\cdot 2^{i-1}$$

where $n_{i-1}\in\{0, 1, \ldots, Q_{i-1}\}$, $Q_{i-1}$ is a positive integer, and $n_{i-1}$ takes a value from a set consisting of hexadecimal numbers, decimal numbers, octal numbers, or binary numbers; specific values of Q corresponding to different i are the same or different; system representations of Q corresponding to different i are the same or different; and $N\in Z^+$ represents that a value is taken from a set of positive integers.

In some alternative embodiments of the present application, the first information may be an MIMO data layer index.

The operation that the terminal determines initialization information for scrambling based at least on the first information may include the following operation.

The terminal determines initialization information for scrambling based on a first parameter, a codeword index, an MIMO data layer index, and a second parameter. The first parameter corresponds to an RNTI associated with PDSCH transmission, and the second parameter is a specific value.

In some alternative embodiments of the present application, the initialization information may satisfy:

$$c_{init}=n_{RNTI}\cdot 2^{15}+q\cdot 2^{14}+l\cdot 2^{13}+n_{ID}$$

where $c_{init}$ represents initialization information; $n_{RNTI}$ corresponds to an RNTI associated with PDSCH transmission; q represents a codeword index; l represents an MIMO data layer index; a value of $n_{ID}$ is within a first preset value range under a condition of satisfying a first preset condition, and corresponds to a cell identifier under a condition of not satisfying the first preset condition; and a maximum value within the first preset value range is 1023.

In some alternative embodiments of the present application, the first information may be a second parameter having a value within a second preset value range, and a maximum value within the second preset value range may be a positive integer greater than 1023.

The operation that the terminal determines initialization information for scrambling based at least on the first information may include the following operation.

The terminal determines initialization information for scrambling based on a first parameter, a codeword index, and a second parameter. The first parameter corresponds to an RNTI associated with PDSCH transmission.

In some alternative embodiments of the present application, the initialization information may satisfy:

$$c_{init}=n_{RNTI} \cdot 2^{15}+q \cdot 2^{14}+n_{ID}$$

where $c_{init}$ represents initialization information; $n_{RNTI}$ corresponds to an RNTI associated with PDSCH transmission; q represents a codeword index; and a value of $n_{ID}$ is within the second preset value range under a condition of satisfying a first preset condition, and corresponds to a cell identifier under a condition of not satisfying the first preset condition.

In some alternative embodiments of the present application, the method may further include that: the terminal receives a downlink DM-RS sent by the network device, and descrambles the downlink DM-RS based on the initialization information.

In some alternative embodiments of the present application, the first information may be an MIMO data layer index.

The operation that the terminal determines initialization information for scrambling at least based on the first information may include the following operation.

The terminal determines initialization information for scrambling based on a third parameter and the MIMO data layer index. The third parameter includes the number of slots in one frame for transmitting a downlink DM-RS and/or the number of OFDM symbols in a slot for transmitting a downlink DM-RS.

In some alternative embodiments of the present application, the initialization information may satisfy:

$$c_{init}=(2^{17}(N_{symb}^{slot}n_{s,f}^{\mu}+l+1)(2N_{ID}^{nSCID}+1)+ \\ 2^q N_{layer-ID}+2N_{ID}^{nSCID}+n_{SCID}) \bmod 2^{31}$$

where $c_{init}$ represents initialization information; l represents the number of OFDM symbols in a slot for transmitting a downlink DM-RS; $n_{s,f}^{\mu}$ represents the number of slots in one frame for transmitting a downlink DM-RS; $N_{layer-ID}$ represents an MIMO data layer index or a codeword identifier or a data channel index transmitted from the transmission point; $n_{SCID}$ represents a scrambling identifier; $N_{symb}^{slot}$ represents the number of symbols in one slot; and a value of $N_{ID}^{nSCID}$ is within a third preset value range under a condition of satisfying a third preset condition, and corresponds to a cell identifier under a condition of not satisfying the third preset condition.

In some alternative embodiments of the present application, the method may further include that: the terminal scrambles a PUSCH based on the initialization information; and the terminal sends the scrambled PUSCH to the network device based on the initialization information.

In some alternative embodiments of the present application, the first information may be a preamble index.

The operation that the terminal determines initialization information for scrambling at least based on the first information may include the following operation.

The terminal determines initialization information for scrambling based on a fourth parameter, a second parameter, and the preamble index. The fourth parameter corresponds to an RNTI associated with PUSCH transmission, and the second parameter is a specific value.

In some alternative embodiments of the present application, the initialization information may satisfy:

$$c_{init}=n_{RNTI} \cdot 2^{15}+n_{ID} \cdot 2^{10}+n_{preamble-ID},$$

or satisfies: $c_{init}=n_{RNTI} \cdot 2^{15}+n_{ID} \cdot 2^{14}+n_{preamble-ID},$ or satisfies: $c_{init}=n_{RNTI} \cdot 2^{15}+n_{preamble-ID} \cdot 2^{14}+n_{ID},$ or satisfies: $c_{init}=n_{RNTI} \cdot 2^{15}+n_{preamble-ID} \cdot 2^{10}+n_{ID},$ where $c_{init}$ represents initialization information; $n_{RNTI}$ corresponds to an RNTI associated with PUSCH transmission; $n_{preamble-ID}$ represents a preamble index; a value of $n_{ID}$ is within a first preset value range under a condition of satisfying a first preset condition, and corresponds to a cell identifier under a condition of not satisfying the first preset condition; and a maximum value within the first preset value range is 1023.

In some alternative embodiments of the present application, the method may further include that: the terminal scrambles an uplink DM-RS based on the initialization information; and the terminal sends the scrambled uplink DM-RS to the network device based on the initialization information.

In some alternative embodiments of the present application, the first information may be a preamble index.

The operation that the terminal determines initialization information for scrambling at least based on the first information may include the following operation.

The terminal determines initialization information for scrambling based on a fifth parameter and the preamble index. The fifth parameter includes the number of slots in one frame for transmitting an uplink DM-RS and/or the number of OFDM symbols in a slot for transmitting an uplink DM-RS.

In some alternative embodiments of the present application, the initialization information may satisfy:

$$c_{init}=(2^{17}(N_{symb}^{slot}n_{s,f}^{\mu}+l+1)(2N_{ID}^{nSCID}+1)+ \\ 2^q N_{preamble-ID}+2N_{ID}^{nSCID}+n_{SCID}) \bmod 2^{31}$$

where $c_{init}$ represents initialization information; l represents the number of OFDM symbols in a slot for transmitting an uplink DM-RS; $n_{s,f}^{\mu}$ represents the number of slots in one frame for transmitting an uplink DM-RS; $N_{preamble-ID}$ represents a preamble slot index; $n_{SCID}$ represents a scrambling identifier; $N_{symb}^{slot}$ represents the number of symbols in one slot; and a value of $N_{ID}^{nSCID}$ is within a third preset value range under a condition of satisfying a third preset condition, and corresponds to a cell identifier under a condition of not satisfying the third preset condition.

According to a third aspect, the embodiments of the present application also provide a network device, which may include: a first determination unit and a second determination unit.

The first determination unit may be configured to determine first information that is associated with at least one of the following information: a transmission point, an MIMO data layer of the transmission point, a codeword transmitted by the transmission point, a data channel transmitted by the transmission point, and a preamble.

The second determination unit may be configured to determine initialization information for scrambling at least based on the first information.

In some alternative embodiments of the present application, the network device may further include a scrambling unit and a first communication unit.

The scrambling unit may be configured to scramble a PDSCH based on the initialization information.

The first communication unit may be configured to send the scrambled PDSCH to a terminal based on the initialization information.

In some alternative embodiments of the present application, the initialization information may be represented by a polynomial form of weighted sums of different powers of 2.

The Initialization Information May Satisfy:

$$c_{init} = n_{N-1} \cdot 2^{N-1} + n_{N-2} \cdot 2^{N-2} + \cdots + n_0 \cdot 2^0 = \sum_{i=1}^{N} n_{i-1} \cdot 2^{i-1}$$

where $n_{i-1} \in \{0, 1, \ldots, Q_{i-1}\}$, $Q_{i-1}$ is a positive integer, and $n_{i-1}$ takes a value from a set consisting of hexadecimal numbers, decimal numbers, octal numbers, or binary numbers; specific values of Q corresponding to different i are the same or different; system representations of Q corresponding to different i are the same or different; and $N \in Z^+$ represents that a value is taken from a set of positive integers.

In some alternative embodiments of the present application, the first information may be an MIMO data layer index.

The second determination unit may be configured to determine initialization information for scrambling based on a first parameter, a codeword index, an MIMO data layer index, and a second parameter. The first parameter corresponds to an RNTI associated with PDSCH transmission, and the second parameter is a specific value.

In some alternative embodiments of the present application, the initialization information may satisfy:

$$c_{init} = n_{RNTI} \cdot 2^{15} + q \cdot 2^{14} + l \cdot 2^{13} + n_{ID}$$

where $c_{init}$ represents initialization information; $n_{RNTI}$ corresponds to an RNTI associated with PDSCH transmission; q represents a codeword index; l represents an MIMO data layer index; a value of $n_{ID}$ is within a first preset value range under a condition of satisfying a first preset condition, and corresponds to a cell identifier under a condition of not satisfying the first preset condition; and a maximum value within the first preset value range is 1023.

In some alternative embodiments of the present application, the first information may be a second parameter having a value within a second preset value range, and a maximum value within the second preset value range may be a positive integer greater than 1023.

The second determination unit may be configured to determine initialization information for scrambling based on a first parameter, a codeword index, and a second parameter. The first parameter corresponds to an RNTI associated with PDSCH transmission.

In some alternative embodiments of the present application, the initialization information may satisfy:

$$c_{init} = n_{RNTI} \cdot 2^{15} + q \cdot 2^{14} + n_{ID}$$

where $c_{init}$ represents initialization information; $n_{RNTI}$ corresponds to an RNTI associated with PDSCH transmission; q represents a codeword index; and a value of $n_{ID}$ is within the second preset value range under a condition of satisfying a first preset condition, and corresponds to a cell identifier under a condition of not satisfying the first preset condition.

In some alternative embodiments of the present application, the network device may further include a first scrambling unit and a first communication unit.

The first scrambling unit may be configured to scramble a downlink DM-RS based on the initialization information.

The first communication unit may be configured to send the scrambled downlink DM-RS to a terminal based on the initialization information.

In some alternative embodiments of the present application, the first information may be an MIMO data layer index.

The second determination unit may be configured to determine initialization information for scrambling based on a third parameter and the MIMO data layer index. The third parameter includes the number of slots in one frame for transmitting a downlink DM-RS and/or the number of OFDM symbols in a slot for transmitting a downlink DM-RS.

In some alternative embodiments of the present application, the initialization information may satisfy:

$$c_{init} = (2^{17}(N_{symb}^{slot} n_{s,f}^\mu + l + 1)(2N_{ID}^{nSCID} + 1) + 2^q N_{layer\text{-}ID} + 2N_{ID}^{nSCID} + n_{SCID}) \bmod 2^{31}$$

where $c_{init}$ represents initialization information; l represents the number of OFDM symbols in a slot for transmitting a downlink DM-RS; $n_{s,f}^\mu$ represents the number of slots in one frame for transmitting a downlink DM-RS; $N_{layer\text{-}ID}$ represents an MIMO data layer index or a codeword identifier or a data channel index transmitted from the transmission point; $n_{SCID}$ represents a scrambling identifier; $N_{symb}^{slot}$ represents the number of symbols in one slot; and a value of $N_{ID}^{nSCID}$ is within a third preset value range under a condition of satisfying a second preset condition, and corresponds to a cell identifier under a condition of not satisfying the second preset condition.

In some alternative embodiments of the present application, the network device may further include a first communication unit and a first descrambling unit.

The first communication unit may be configured to receive a PUSCH transmitted by a terminal.

The first descrambling unit may be configured to descramble the PUSCH based on the initialization information.

In some alternative embodiments of the present application, the first information may be a preamble index.

The second determination unit may be configured to determine initialization information for scrambling based on a fourth parameter, a second parameter, and the preamble index. The fourth parameter corresponds to an RNTI associated with PUSCH transmission, and the second parameter is a specific value.

In some alternative embodiments of the present application, the initialization information may satisfy:

$$c_{init} = n_{RNTI} \cdot 2^{15} + n_{ID} \cdot 2^{10} + n_{preamble\text{-}ID},$$

or satisfies: $c_{init} = n_{RNTI} \cdot 2^{15} + n_{ID} \cdot 2^{14} + n_{preamble\text{-}ID},$ or satisfies: $c_{init} = n_{RNTI} \cdot 2^{15} + n_{preamble\text{-}ID} \cdot 2^{14} + n_{ID},$ or satisfies: $c_{init} = n_{RNTI} \cdot 2^{15} + n_{preamble\text{-}ID} \cdot 2^{10} + n_{ID},$ where $c_{init}$ represents initialization information; $n_{RNTI}$ corresponds to an RNTI associated with PUSCH transmission; $n_{preamble\text{-}ID}$ represents a preamble index; a value of $n_{ID}$ is within a first preset value range under a condition of satisfying a first preset condition, and corresponds to a cell identifier under a condition of not satisfying the first preset condition; and a maximum value within the first preset value range is 1023.

In some alternative embodiments of the present application, the network device may further include a first communication unit and a first descrambling unit.

The first communication unit may be configured to receive an uplink DM-RS transmitted by a terminal.

The first descrambling unit may be configured to descramble the uplink DM-RS based on the initialization information.

In some alternative embodiments of the present application, the first information may be a preamble index.

The second determination unit may be configured to determine initialization information for scrambling based on a fifth parameter and the preamble index. The fifth parameter includes the number of slots in one frame for transmitting an uplink DM-RS and/or the number of OFDM symbols in a slot for transmitting an uplink DM-RS.

In some alternative embodiments of the present application, the initialization information may satisfy:

$$c_{init}=(2^{17}(N_{symb}^{slot}n_{s,f}^{\mu}+l+1)(2N_{ID}^{nSCID}+1)+2^qN_{preamble-ID}+2N_{ID}^{nSCID}+n_{SCID}) \bmod 2^{31}$$

where $c_{init}$ represents initialization information; $l$ represents the number of OFDM symbols in a slot for transmitting an uplink DM-RS; $n_{s,f}^{\mu}$ represents the number of slots in one frame for transmitting an uplink DM-RS; $N_{preamble-ID}$ represents a preamble index; $n_{SCID}$ represents a scrambling identifier; $N_{symb}^{slot}$ represents the number of symbols in one slot; and a value of $n_{ID}^{SCID}$ is within a third preset value range under a condition of satisfying a third preset condition, and corresponds to a cell identifier under a condition of not satisfying the third preset condition.

According to a fourth aspect, the embodiments of the present application also provide a terminal, which may include a second communication unit and a third determination unit.

The second communication unit may be configured to obtain first information configured by a network device. The first information is associated with at least one of the following information: a transmission point, an MIMO data layer of the transmission point, a codeword transmitted by the transmission point, a data channel transmitted by the transmission point, and a preamble.

The third determination unit may be configured to determine initialization information for scrambling at least based on the first information.

In some alternative embodiments of the present application, the terminal may further include a second descrambling unit.

The second communication unit may be further configured to receive a PDSCH sent by the network device.

The second descrambling unit may be configured to descramble the PDSCH based on the initialization information.

In some alternative embodiments of the present application, the initialization information may be represented by a polynomial form of weighted sums of different powers of 2.

The Initialization Information May Satisfy:

$$c_{init}=n_{N-1}\cdot 2^{N-1}+n_{N-2}\cdot 2^{N-2}+\cdots+n_0\cdot 2^0=\sum_{i=1}^{N}n_{i-1}\cdot 2^{i-1}$$

where $n_{i-1}\in\{0,1,\ldots,Q_{i-1}\}$, $Q_{i-1}$ is a positive integer, and $n_{i-1}$ takes a value from a set consisting of hexadecimal numbers, decimal numbers, octal numbers, or binary numbers; specific values of Q corresponding to different i are the same or different; system representations of Q corresponding to different i are the same or different; and $N\in Z^+$ represents that a value is taken from a set of positive integers.

In some alternative embodiments of the present application, the first information may be an MIMO data layer index.

The third determination unit may be configured to determine initialization information for scrambling based on a first parameter, a codeword index, an MIMO data layer index, and a second parameter. The first parameter corresponds to an RNTI associated with PDSCH transmission, and the second parameter is a specific value.

In some alternative embodiments of the present application, the initialization information may satisfy:

$$c_{init}=n_{RNTI}2^{15}+q\cdot 2^{14}+l\cdot 2^{13}+n_{ID}$$

where $c_{init}$ represents initialization information; $n_{RNTI}$ corresponds to an RNTI associated with PDSCH transmission; q represents a codeword index; l represents an MIMO data layer index; a value of nip is within a first preset value range under a condition of satisfying a first preset condition, and corresponds to a cell identifier under a condition of not satisfying the first preset condition; and a maximum value within the first preset value range is 1023.

In some alternative embodiments of the present application, the first information may be a second parameter having a value within a second preset value range, and a maximum value within the second preset value range may be a positive integer greater than 1023.

The third determination unit may be configured to determine initialization information for scrambling based on a first parameter, a codeword index, and a second parameter. The first parameter corresponds to an RNTI associated with PDSCH transmission.

In some alternative embodiments of the present application, the initialization information may satisfy:

$$c_{init}=n_{RNTI}2^{15}+q\cdot 2^{14}+n_{ID}$$

where $c_{init}$ represents initialization information; $n_{RNTI}$ corresponds to an RNTI associated with PDSCH transmission; q represents a codeword index; and a value of $n_{ID}$ is within the second preset value range under a condition of satisfying a first preset condition, and corresponds to a cell identifier under a condition of not satisfying the first preset condition.

In some alternative embodiments of the present application, the second communication unit may be further configured to receive a downlink DM-RS sent by the network device, and descramble the downlink DM-RS based on the initialization information.

In some alternative embodiments of the present application, the first information may be an MIMO data layer index.

The third determination unit may be configured to determine initialization information for scrambling based on a third parameter and the MIMO data layer index. The third parameter includes the number of slots in one frame for transmitting a downlink DM-RS and/or the number of OFDM symbols in a slot for transmitting a downlink DM-RS.

In some alternative embodiments of the present application, the initialization information may satisfy:

$$c_{init}=(2^{17}(N_{symb}^{slot}n_{s,f}^{\mu}+l+1)(2N_{ID}^{nSCID}+1)+2^qN_{layer-ID}+2N_{ID}^{nSCID}+n_{SCID}) \bmod 2^{31}$$

where $c_{init}$ represents initialization information; l represents the number of OFDM symbols in a slot for transmitting a downlink DM-RS; $n_{s,f}^{\mu}$ represents the number of slots in one frame for transmitting a downlink DM-RS; $N_{layer\text{-}ID}$ represents an MIMO data layer index or a codeword identifier or a data channel index transmitted from the transmission point; $n_{SCID}$ represents a scrambling identifier; $N_{symb}^{slot}$ represents the number of symbols in one slot; and a value of $N_{ID}^{nSCID}$ is within a third preset value range under a condition of satisfying a second preset condition, and corresponds to a cell identifier under a condition of not satisfying the second preset condition.

In some alternative embodiments of the present application, the terminal may further include a second scrambling unit, configured to scramble a PUSCH based on the initialization information.

The second communication unit may be further configured to send the scrambled PUSCH to the network device based on the initialization information.

In some alternative embodiments of the present application, the first information may be a preamble index.

The third determination unit may be configured to determine initialization information for scrambling based on a fourth parameter, a second parameter, and the preamble index. The fourth parameter corresponds to an RNTI associated with PUSCH transmission, and the second parameter is a specific value.

In some alternative embodiments of the present application, the initialization information may satisfy:

$c_{init}=n_{RNTI}\cdot 2^{15}+n_{ID}\cdot 2^{10}+n_{preamble\text{-}ID}$, or satisfies: $c_{init}=n_{RNTI}\cdot 2^{15}+n_{ID}\cdot 2^{14}+n_{preamble\text{-}ID}$, or satisfies: $c_{init}=n_{RNTI}\cdot 2^{15}+n_{preamble\text{-}ID}\cdot 2^{14}+n_{ID}$, or satisfies: $c_{init}=n_{RNTI}\cdot 2^{15}+n_{preamble\text{-}ID}\cdot 2^{10}+n_{ID}$, where $c_{init}$ represents initialization information; $n_{RNTI}$ corresponds to an RNTI associated with PUSCH transmission; $n_{preamble\text{-}ID}$ represents a preamble index; a value of $n_{ID}$ is within a first preset value range under a condition of satisfying a first preset condition, and corresponds to a cell identifier under a condition of not satisfying the first preset condition.

In some alternative embodiments of the present application, the terminal may further include a second scrambling unit, configured to scramble an uplink DM-RS based on the initialization information.

The second communication unit may be further configured to send the scrambled uplink DM-RS to the network device based on the initialization information.

In some alternative embodiments of the present application, the first information may be a preamble index.

The third determination unit may be configured to determine initialization information for scrambling based on a fifth parameter and the preamble index. The fifth parameter includes the number of slots in one frame for transmitting an uplink DM-RS and/or the number of OFDM symbols in a slot for transmitting an uplink DM-RS.

In some alternative embodiments of the present application, the initialization information may satisfy:

$c_{init}=(2^{17}(N_{symb}^{slot}n_{s,f}^{\mu}+l+1)(2N_{ID}^{nSCID}+1)+2^{q}N_{preamble\text{-}ID}+2N_{ID}^{nSCID}+n_{SCID})\bmod 2^{31}$ where $c_{init}$ represents initialization information; l represents the number of OFDM symbols in a slot for transmitting an uplink DM-RS; $n_{s,f}^{\mu}$ represents the number of slots in one frame for transmitting an uplink DM-RS; $N_{preamble\text{-}ID}$ represents a preamble index; $n_{SCID}$ represents a scrambling identifier; $N_{symb}^{slot}$ represents the number of symbols in one slot; and a value of $N_{ID}^{nSCID}$ is within a third preset value range under a condition of satisfying a third preset condition, and corresponds to a cell identifier under a condition of not satisfying the third preset condition.

The embodiments of the present application also provide a computer-readable storage medium having a computer program stored thereon. The program, when executed by a processor, may implement the steps of the method in the foregoing first aspect or second aspect of the embodiments of the present application.

The embodiments of the present application also provide a network device, which may include: a memory, a processor, and a computer program stored on the memory and operable on the processor. The processor, when executing the program, may implement the steps of the method in the foregoing first aspect of the embodiments of the present application.

The embodiments of the present application also provide a terminal, which may include: a memory, a processor, and a computer program stored on the memory and operable on the processor. The processor, when executing the program, may implement the steps of the method in the foregoing second aspect of the embodiments of the present application.

The embodiments of the present application provide a scrambling information processing method, a terminal, and a network device. The method includes that: a network device determines first information that is associated with a transmission point, an MIMO data layer of the transmission point, a codeword transmitted from the transmission point, a data channel transmitted from the transmission point, or a preamble; and the network device determines initialization information for scrambling at least based on the first information. By adopting the technical solutions of the embodiments of the present application, through first information, which is associated with a transmission point, an MIMO data layer of the transmission point, a codeword transmitted from the transmission point, a data channel transmitted from the transmission point, or a preamble, initialization information for scrambling is determined based on the first information. On one hand, different pieces of initialization information are used for different MIMO data layers aiming at different transmission points or the same transmission point or the codeword transmitted by the transmission point or the data channel transmitted by the transmission point, so that the interference between data streams is greatly reduced. On the other hand, for two-step random access, different pieces of initialization information are used for different preamble codes by establishing a relationship between a preamble and a PUSCH or DM-RS, and the detection or demodulation performance of the PUSCH in the two-step random access process is improved.

DETAILED DESCRIPTION

The present application will be further described in detail below with reference to the accompanying drawings and specific embodiments.

Figure 1:
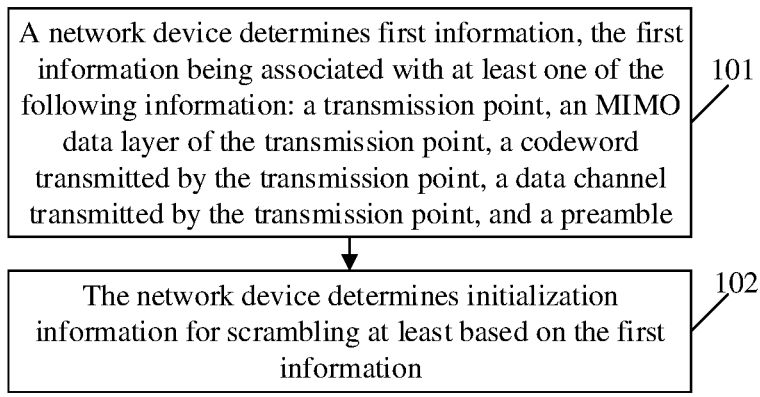
FIG. 1 is a first schematic flowchart of a scrambling information processing method according to embodiments of the present application.

Embodiments of the present application provide a scrambling information processing method. FIG. 1 is a first schematic flowchart of a scrambling information processing method according to embodiments of the present application. As shown in FIG. 1, the method includes the following steps.

In step 101, a network device determines first information that is associated with at least one of the following information: a transmission point, an MIMO data layer of the transmission point, a codeword transmitted by the transmission point, a data channel transmitted by the transmission point, and a preamble.

In step 102, the network device determines initialization information for scrambling based at least on the first information.

The initialization information of the present embodiment may be represented as a polynomial form of weighted sums of different powers of 2, and may be specifically represented as follows:

$$c_{init} = n_{N-1} \cdot 2^{N-1} + n_{N-2} \cdot 2^{N-2} + \cdots + n_0 \cdot 2^0 = \sum_{i=1}^{N} n_{i-1} \cdot 2^{i-1}$$

$n_{i-1} \in \{0, 1, \ldots, Q_{i-1}\}$, $Q_{i-1}$ is a positive integer, and takes a value from a set consisting of hexadecimal numbers, decimal numbers, octal numbers, or binary numbers; specific values of Q corresponding to different i may be different, that is, specific values of Q corresponding to different i are the same or different; and system representations of Q corresponding to different i may be different, that is, system representations of Q corresponding to different i are the same or different. $N \in \mathbb{Z}^+$ represents that a value is taken from a set of positive integers.

The initialization information in the present embodiment is used for scrambling. On one hand, the initialization information may be used to scramble a service channel, such as a PDSCH and/or a PUSCH; or, the initialization information may be used to scramble a DM-RS. On the other hand, the service channel comprises an uplink service channel such as a PUSCH and a downlink service channel such as a PDSCH. Accordingly, the DM-RS also comprises an uplink DM-RS and a downlink DM-RS. The following embodiments of the present application are set forth respectively with an uplink aspect and a downlink aspect.

As a first implementation mode, the method further includes that: the network device scrambles a PDSCH based on the initialization information; and the network device sends the scrambled PDSCH to a terminal based on the initialization information.

The initialization information determined in the present embodiment is used for scrambling the PDSCH, specifically including the following two implementation modes.

As an implementation mode, the first information is an MIMO data layer index. It can be understood that different transmission points (TRP/Panel) or different MIMO data layers for a same transmission point correspond to different MIMO data layer indexes. The operation that the network device determines initialization information for scrambling at least based on the first information includes that: the network device determines initialization information for scrambling based on a first parameter, a codeword index, an MIMO data layer index, and a second parameter. The first parameter corresponds to an RNTI associated with PDSCH transmission, and the second parameter is a specific value.

Specifically, the initialization information satisfies:

$$c_{init} = n_{RNTI} \cdot 2^{15} + q \cdot 2^{14} + l \cdot 2^{13} + n_{ID}$$

$c_{init}$ represents initialization information; $n_{RNTI}$ corresponds to an RNTI associated with PDSCH transmission; q represents a codeword index, $q \in \{0, 1\}$; l represents an MIMO data layer index; $l \in \{0, \ldots, X\}$, X takes the value of a decimal positive integer, for example: X=8, 16, 32, or 64, etc.; a value of nip is within a first preset value range under a condition of satisfying a first preset condition, and corresponds to a cell identifier under a condition of not satisfying the first preset condition; and a maximum value within the first preset value range is 1023. In various embodiments of the present application, a codeword index is a transmission block index, and a codeword identifier is a transmission block identifier.

As an implementation mode, the case where nip satisfies a first preset condition includes: specific field in high-layer Radio Resource Control (RRC) signaling (specifically, for example, a field dataScramblingIdentityPDSCH) is configured, an RNTI is equal to Cell-RNTI (C-RNTI), Modulation and Coding Scheme-C-RNTI (MCS-C-RNTI) or Configured grant Scheduling-RNTI (CS-RNTI), and it is determined that $n_{ID}$ satisfies the first preset condition when transmission is not scheduled by a Downlink Control Information (DCI) format 1_0 in a common search space, and $n_{ID} \in \{0, 1, \ldots, 1023\}$. Accordingly, in other cases, it is determined that $n_{ID}$ does not satisfy the first preset condition, and $n_{ID} = N_{cell}^{ID}$, where $N_{cell}^{ID}$ a cell ID.

As another implementation mode, the first information is a second parameter, a value of which is within a second preset value range, and a maximum value within the second preset value range is a positive integer greater than 1023. The operation that the network device determines initialization information for scrambling at least based on the first information includes that: the network device determines initialization information for scrambling based on a first parameter, a codeword index, and a second parameter. The first parameter corresponds to an RNTI associated with PDSCH transmission.

The existing initialization information satisfies:

$$c_{init} = n_{RNTI} \cdot 2^{15} + q \cdot 2^{14} + n_{ID}$$

Unlike the first implementation mode, the present implementation mode does not introduce the MIMO data layer index, but expands the value range corresponding to the second parameter.

In the present embodiment, the initialization information satisfies:

$$c_{init} = n_{RNTI} \cdot 2^{15} + q \cdot 2^{14} + n_{ID}$$

cine represents initialization information; $n_{RNTI}$ corresponds to an RNTI associated with PDSCH transmission; q represents a codeword index, $q \in \{0, 1\}$; and a value of $n_{ID}$ is within the second preset value range under a condition of satisfying a first preset condition, and corresponds to a cell identifier under a condition of not satisfying the first preset condition.

As an implementation mode, the case where nip satisfies a first preset condition includes: specific field in high-layer RRC signaling (specifically, for example, a field dataScramblingIdentityPDSCH) is configured, an RNTI is equal to C-RNTI, MCS-C-RNTI or CS-RNTI, and it is determined that $n_{ID}$ satisfies the first preset condition when transmission is not scheduled by a DCI format 1_0 in a common search space, and $n_{ID} \in \{0, 1, \ldots, Y\}$. Y is a positive integer and greater than 1023, for example: $Y = 8192 = 2^{13} (>8088)$, etc. Accordingly, in other cases, it is determined that $n_{ID}$ does not satisfy the first preset condition, and $n_{ID} = N_{cell}^{ID}$, where $N_{cell}^{ID}$ is a cell ID.

As a second implementation mode, the method further includes that: the network device scrambles a downlink DM-RS based on the initialization information; and the network device sends the scrambled downlink DM-RS to a terminal based on the initialization information.

The initialization information determined in the present embodiment is used for scrambling the downlink DM-RS, specifically including the following operation.

The first information is an MIMO data layer index. It can be understood that different transmission points (TRP/Panel) or different MIMO data layers at a same transmission point correspond to different MIMO data layer indexes. The operation that the network device determines initialization information for scrambling at least based on the first information includes that: the network device determines initialization information for scrambling based on a third parameter and the MIMO data layer index. The third parameter includes the number of slots in one frame for transmitting a downlink DM-RS and/or the number of OFDM symbols in a slot for transmitting a downlink DM-RS.

Specifically, the initialization information satisfies:

$$c_{init} = (2^{17}(N_{symb}^{slot} n_{s,f}^{\mu} + l + 1)(2N_{ID}^{nSCID} + 1) + 2^q N_{layer-ID} + 2N_{ID}^{nSCID} + n_{SCID}) \bmod 2^{31} \quad (3)$$

$c_{init}$ represents initialization information; l represents the number of OFDM symbols in a slot for transmitting a downlink DM-RS; $n_{s,f}^{\mu}$ represents the number of slots in one frame for transmitting a downlink DM-RS; $N_{layer-ID}$ represents an MIMO data layer index or a codeword identifier or a data channel index transmitted from the transmission point; $N_{layer-ID} \in \{0, 1, \ldots, X\}$, X takes the value of a decimal positive integer, for example: X=8, 16, 32, or 64, etc.; $n_{SCID}$ represents a scrambling identifier; $N_{symb}^{slot}$ represents the number of symbols in one slot; $q \in \{2, 3, \ldots, 16\}$, any positive integer value in the above set may be taken; a value of $N_{ID}^{nSCID}$ is within a third preset value range under a condition of satisfying a second preset condition, and corresponds to a cell identifier under a condition of not satisfying the second preset condition, and mod represents a modulo operation. A maximum value of the third preset value range is 65535.

As an implementation mode, the case where $N_{ID}^{nSCID}$ satisfies a second preset condition includes: if high-layer signaling is configured and the PDSCH is scheduled by a PDCCH DCI format 1_1 scrambled with a Cyclic Redundancy Check (CRC) using C-RNTI, MCS-C-RNTI or CS-RNTI, $N_{ID}^0, N_{ID}^1 \in \{0, 1, \ldots, 65535\}$, where the values of $N_{ID}^0$ and $N_{ID}^1$ are respectively configured by the field scrambling ID0 and the field scrambling ID1 in high-layer signaling DMRS-DownlinkConfig.

If high-layer signaling is configured and the PDSCH is scheduled by a PDCCH DCI format 1_1 scrambled with a CRC using C-RNTI, MCS-C-RNTI or CS-RNTI, $N_{ID}^0 \in \{0, 1, \ldots, 65535\}$, where the value of n is configured by the field scrambling ID0 in the high-layer signaling DMRS-Downlink Config.

The case where $N_{ID}^{nSCID}$ satisfies the second preset condition includes: in any case other than the above, $N_{ID}^{nSCID} = N_{ID}^{cell}$, where $N_{ID}^{cell}$ represents a cell identifier.

If DCI format 1_1 is used, $n_{SCID} \in \{0, 1\}$, where the value of $n_{SCID}$ is configured by a DM-RS sequence initialization field in a DCI field, otherwise, if DCI format 1_1 is not used, $n_{SCID} = 0$.

As a third implementation mode, the method further includes that: the network device receives a PUSCH transmitted by a terminal; and the network device descrambles the PUSCH based on the initialization information.

According to the present implementation mode, in the two-step random access process, preamble index is introduced for corresponding different initialization information for scrambling PUSCHs. Specifically, the terminal scrambles the PUSCH according to the determined initialization information, and the network device descrambles the received PUSCH according to the determined initialization information.

As an implementation mode, the first information is a preamble index. The operation that the network device determines initialization information for scrambling at least based on the first information includes that: the network device determines initialization information for scrambling based on a fourth parameter, a second parameter, and the preamble index. The fourth parameter corresponds to an RNTI associated with PUSCH transmission, and the second parameter is a specific value.

Specifically, the initialization information satisfies:

$$c_{init} = n_{RNTI} \cdot 2^{15} + n_{ID} \cdot 2^{10} + n_{preamble-ID} \quad (4)$$

$$\text{or satisfies: } c_{init} = n_{RNTI} \cdot 2^{15} + n_{ID} \cdot 2^{14} + n_{preamble-ID} \quad (5)$$

$$\text{or satisfies: } c_{init} = n_{RNTI} \cdot 2^{15} + n_{preamble-ID} \cdot 2^{14} + n_{ID} \quad (6)$$

$$\text{or satisfies: } c_{init} = n_{RNTI} \cdot 2^{15} + n_{preamble-ID} \cdot 2^{10} + n_{ID} \quad (7)$$

$c_{init}$ represents initialization information; $n_{RNTI}$ corresponds to an RNTI associated with PUSCH transmission; $n_{preamble-ID}$ represents a preamble index, a value range thereof being $n_{preamble-ID} \in \{0, 1, \ldots, 63\}$; a value of nip is within a first preset value range under a condition of satisfying a first preset condition, and corresponds to a cell identifier under a condition of not satisfying the first preset condition; and a maximum value within the first preset value range is 1023.

As an implementation mode, the case where nip satisfies a first preset condition includes: specific field in high-layer RRC signaling (specifically, for example, a field dataScramblingIdentityPDSCH) is configured, an RNTI is equal to C-RNTI, MCS-C-RNTI or CS-RNTI, and it is determined that $n_{ID}$ satisfies the first preset condition when transmission is not scheduled by a DCI format 1_0 in a common search space, and $n_{ID} \in \{0, 1, \ldots, 1023\}$. Accordingly, in other cases, it is determined that $n_{ID}$ does not satisfy the first preset condition, and $n_{ID}=N_{cell}^{ID}$, where $N_{cell}^{ID}$ is a cell ID.

As a fourth implementation mode, the method further includes that: the network device receives an uplink DM-RS transmitted by a terminal; and the network device descrambles the uplink DM-RS based on the initialization information.

The initialization information determined in the present embodiment is used to scramble the uplink DM-RS. Specifically, the terminal scrambles the uplink DM-RS according to the determined initialization information, and the network device descrambles the received uplink DM-RS according to the determined initialization information.

According to the present implementation mode, in the two-step random access process in, preamble index is introduced for corresponding different initialization information for scrambling uplink DM-RS. Specifically, the terminal scrambles the uplink DM-RS according to the determined initialization information, and the network device descrambles the received uplink DM-RS according to the determined initialization information.

As an implementation mode, the first information is a preamble index. The operation that the network device determines initialization information for scrambling at least based on the first information includes that: the network device determines initialization information for scrambling based on a fifth parameter and the preamble index. The fifth parameter includes the number of slots in one frame for transmitting an uplink DM-RS and/or the number of OFDM symbols in a slot for transmitting an uplink DM-RS.

Specifically, the initialization information satisfies:

$$c_{init}=(2^{17}(N_{symb}^{slot}n_{s,f}^{\mu}+l+1)(2N_{ID}^{nSCID}+1)+ 2^q N_{layer\text{-}ID}+2N_{ID}^{nSCID}+n_{SCID}) \bmod 2^{31} \quad (8)$$

$c_{init}$ represents initialization information; l represents the number of OFDM symbols in a slot for transmitting an uplink DM-RS; $n_{s,f}^{\mu}$ represents the number of slots in one frame for transmitting an uplink DM-RS; $N_{preamble\text{-}ID}$ represents a preamble index; represents a scrambling identifier; $N_{symb}^{slot}$ represents the number of symbols in one slot, $N_{preamble\text{-}ID} \in \{0, 1, \ldots, 63\}$; $q \in \{2, 3, \ldots, 16\}$, any positive integer value in the above set may be taken; a value of $N_{ID}^{nSCID}$ is within a third preset value range under a condition of satisfying a third preset condition, and corresponds to a cell identifier; and mod represents a modulo operation under a condition of not satisfying the third preset condition.

As an implementation mode, the case where $N_{ID}^{nSCID}$ satisfies a third preset condition includes: if high-layer signaling is configured and the PUSCH is scheduled by a DCI format 0_1 or transmitted using a configured grant, $N_{ID}^0$, $N_{ID}^1 \in \{0, 1, \ldots, 65535\}$, where the values of $N_{ID}^0$ and $N_{ID}^1$ are respectively configured by fields scramblingID0 and scramblingID1 in high-layer signaling DMRS-UplinkConfig.

If high-layer signaling is configured and the PDSCH is scheduled by a PDCCH DCI format 0_1 scrambled with a CRC using C-RNTI, MCS-C-RNTI or CS-RNTI, $N_{ID}^0 \in \{0, 1, \ldots, 65535\}$, where the value of n is configured by the field scrambling ID0 in the high-layer signaling DMRS-Uplink Config.

The case where $N_{ID}^{nSCID}$ satisfies the second preset condition includes: in any case other than the above, $N_{ID}^{nSCID}=N_{ID}^{cell}$, where $N_{ID}^{cell}$ represents a cell identifier.

If DCI format 0_1 is used, $n_{SCID} \in \{0, 1\}$, where the value of $n_{SCID}$ is configured by a DM-RS sequence initialization field in a DCI field or high-layer signaling dmrs-SeqInitialization, otherwise, if DCI format 1_1 is not used, $n_{SCID}=0$.

By adopting the technical solutions of the embodiments of the present application, through first information associated with a transmission point, an MIMO data layer of the transmission point, a codeword transmitted by the transmission point, a data channel transmitted by the transmission point, or a preamble, initialization information for scrambling is determined based on the first information. On one hand, different pieces of initialization information are used for different MIMO data layers for different transmission points or the same transmission point or the codeword transmitted from the transmission point or the data channel transmitted from the transmission point, so that the interference between data streams is greatly reduced. On the other hand, for the two-step random access, different pieces of initialization information are used for different preamble codes, and the detection or demodulation performance of the PUSCH in the two-step random access process is improved.

Figure 2:
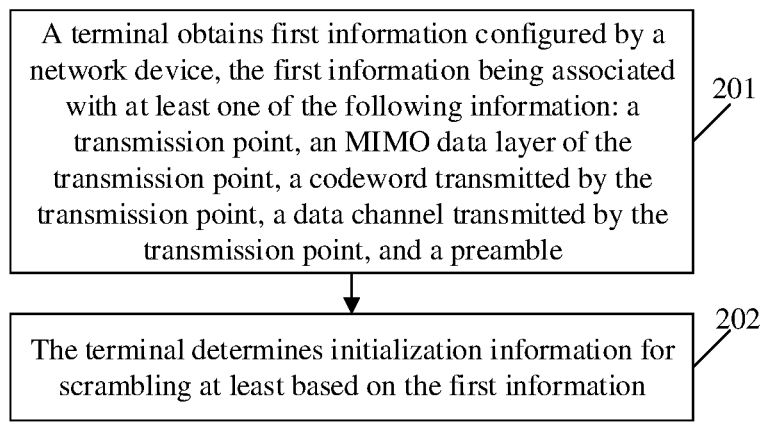
FIG. 2 is a second schematic flowchart of a scrambling information processing method according to embodiments of the present application.

Embodiments of the present application also provide a scrambling information processing method. FIG. 2 is a second schematic flowchart of a scrambling information processing method according to embodiments of the present application. As shown in FIG. 2, the method includes the following steps.

In step 201, a terminal obtains first information configured by a network device. The first information is associated with at least one of the following information: a transmission point, an MIMO data layer of the transmission point, a codeword transmitted from the transmission point, a data channel transmitted from the transmission point, and a preamble.

In step 202, the terminal determines initialization information for scrambling based at least on the first information.

In the present embodiment, in order to realize the normal communication between the terminal and the network device, the terminal adopts the same confirmation mode of initialization information as the network device for the same service channel or DM-RS, and the specific confirmation mode may be described with reference to the previous embodiments.

As a first implementation mode, the method further includes that: the terminal receives a PDSCH sent by the network device, and descrambles the PDSCH based on the initialization information.

As an implementation mode, the first information is an MIMO data layer index. The operation that the terminal determines initialization information for scrambling based at least on the first information includes that: the terminal determines initialization information for scrambling based on a first parameter, a codeword index, an MIMO data layer index, and a second parameter. The first parameter corresponds to an RNTI associated with PDSCH transmission, and the second parameter is a specific value.

The initialization information may satisfy:

$$c_{init}=n_{RNTI} \cdot 2^{15}+q \cdot 2^{14}+l \cdot 2^{13}+n_{ID} \quad (1)$$

$c_{init}$ represents initialization information; $n_{RNTI}$ corresponds to an RNTI associated with PDSCH transmission; q represents a codeword index, $q \in \{0, 1\}$; l represents an MIMO data layer index; $l \in \{0, \ldots, X\}$, X takes the value of a decimal positive integer, for example: X=8/16/32/64, etc.; a value of nip is within a first preset value range under a condition of satisfying a first preset condition, and corresponds to a cell identifier under a condition of not satisfying the first preset condition; and a maximum value within the first preset value range is 1023.

As an implementation mode, the case where nip satisfies a first preset condition includes: specific field in high-layer RRC signaling (specifically, for example, a field dataScramblingIdentityPDSCH) is configured, an RNTI is equal to C-RNTI, MCS-C-RNTI or CS-RNTI, and it is determined that nip satisfies the first preset condition when transmission is not scheduled by a Downlink Control Information (DCI) format 1_0 in a common search space, and $n_{ID} \in \{0, 1, \ldots, 1023\}$. Accordingly, in other cases, it is determined that nip does not satisfy the first preset condition, and $n_{ID} = N_{cell}^{ID}$, where $N_{cell}^{ID}$ is a cell ID.

As another implementation mode, the first information is a second parameter, a value of which is within a second preset value range, and a maximum value within the second preset value range is a positive integer greater than 1023. The operation that the terminal determines initialization information for scrambling at least based on the first information includes that: the terminal determines initialization information for scrambling based on a first parameter, a codeword index, and a second parameter. The first parameter corresponds to an RNTI associated with PDSCH transmission.

Specifically, the initialization information satisfies:

$$c_{init} = n_{RNTI} \cdot 2^{15} + q \cdot 2^{14} + n_{ID} \quad (2)$$

$c_{init}$ represents initialization information; $n_{RNTI}$ corresponds to an RNTI associated with PDSCH transmission; q represents a codeword index, $q \in \{0, 1\}$; and a value of $n_{ID}$ is within the second preset value range under a condition of satisfying a first preset condition, and corresponds to a cell identifier under a condition of not satisfying the first preset condition.

As an implementation mode, the case where $n_{ID}$ satisfies a first preset condition includes: specific field in high-layer RRC signaling (specifically, for example, a field dataScramblingIdentityPDSCH) is configured, an RNTI is equal to C-RNTI, MCS-C-RNTI or CS-RNTI, and it is determined that $n_{ID}$ satisfies the first preset condition when transmission is not scheduled by a DCI format 1_0 in a common search space, and $n_{ID} \in \{0, 1, \ldots, Y\}$. Y is a positive integer and greater than 1023, for example: $Y = 8192 = 2^{13}$ (>8088), etc. Accordingly, in other cases, it is determined that nip does not satisfy the first preset condition, and $n_{ID} = N_{cell}^{ID}$, where $N_{cell}^{ID}$ is a cell ID.

As a second implementation mode, the method further includes that: the terminal receives a downlink DM-RS sent by the network device, and descrambles the downlink DM-RS based on the initialization information.

As an embodiment, the first information is an MIMO data layer index. The operation that the terminal determines initialization information for scrambling at least based on the first information includes that: the terminal determines initialization information for scrambling based on a third parameter and the MIMO data layer index. The third parameter includes the number of slots in one frame for transmitting a downlink DM-RS and/or the number of OFDM symbols in a slot for transmitting a downlink DM-RS.

Specifically, the initialization information satisfies:

$$c_{init} = (2^{17}(N_{symb}^{slot} n_{s,f}^{\mu} + l + 1)(2 N_{ID}^{nSCID} + 1) + 2^q N_{layer-ID} + 2 N_{ID}^{nSCID} + n_{SCID}) \bmod 2^{31} \quad (3)$$

$c_{init}$ represents initialization information; l represents the number of OFDM symbols in a slot for transmitting a downlink DM-RS; $n_{s,f}^{\mu}$ represents the number of slots in one frame for transmitting a downlink DM-RS; $N_{layer-ID}$ represents an MIMO data layer index or a codeword identifier or a data channel index transmitted from the transmission point; $N_{layer-ID} \in \{0, 1, \ldots, X\}$, X takes the value of a decimal positive integer, for example: $X = 8/16/32/64$, etc.; $n_{SCID}$ represents a scrambling identifier; $N_{symb}^{slot}$ represents the number of symbols in one slot; $q \in \{2, 3, \ldots, 16\}$, any positive integer value in the above set may be taken; a value of $N_{ID}^{nSCID}$ is within a third preset value range under a condition of satisfying a second preset condition, and corresponds to a cell identifier under a condition of not satisfying the second preset condition, and mod represents a modulo operation. A maximum value of the third preset value range is 65535.

As an implementation mode, the case where $N_{ID}^{SCID}$ satisfies a second preset condition includes: if high-layer signaling is configured and the PDSCH is scheduled by a PDCCH DCI format 1_1 scrambled with a CRC using C-RNTI, MCS-C-RNTI or CS-RNTI, $N_{ID}^0$, $N_{ID}^1 \in \{0, 1, \ldots, 65535\}$, where the values of $N_{ID}^0$ and $N_{ID}^1$ are respectively configured by fields scramblingID0 and scramblingID1 in high-layer signaling DMRS-DownlinkConfig.

If high-layer signaling is configured and the PDSCH is scheduled by a PDCCH DCI format 1_1 scrambled with a CRC using C-RNTI, MCS-C-RNTI or CS-RNTI, $N_{ID}^0 \in \{0, 1, \ldots, 65535\}$, where the value of $N_{ID}^0$ is configured by the field scrambling ID0 in the high-layer signaling DMRS-Downlink Config.

The case where $N_{ID}^{nSCID}$ satisfies the second preset condition includes: in any cdl case other than the above, $N_{ID}^{nSCID} = N_{ID}^{cell}$, where $N_{ID}^{cell}$ represents a cell identifier.

If DCI format 1_1 is used, $n_{SCID} \in \{0, 1\}$, where the value of $n_{SCID}$ is configured by a DM-RS sequence initialization field in a DCI field, otherwise, if DCI format 1_1 is not used, $n_{SCID} = 0$.

As a third implementation mode, the method further includes that: the terminal scrambles a PUSCH based on the initialization information; and the terminal sends the scrambled PUSCH to the network device based on the initialization information.

As an example, the first information is a preamble index. The operation that the terminal determines initialization information for scrambling at least based on the first information includes that: the terminal determines initialization information for scrambling based on a fourth parameter, a second parameter, and the preamble index. The fourth parameter corresponds to an RNTI associated with PUSCH transmission, and the second parameter is a specific value.

Specifically, the initialization information satisfies:

$$c_{init} = n_{RNTI} \cdot 2^{15} + n_{ID} \cdot 2^{10} + n_{preamble-ID} \quad (4)$$

$$\text{or satisfies: } c_{init} = n_{RNTI} \cdot 2^{15} + n_{ID} \cdot 2^{14} + n_{preamble-ID} \quad (5)$$

$$\text{or satisfies: } c_{init} = n_{RNTI} \cdot 2^{15} + n_{preamble-ID} \cdot 2^{14} + n_{ID} \quad (6)$$

$$\text{or satisfies: } c_{init} = n_{RNTI} \cdot 2^{15} + n_{preamble-ID} \cdot 2^{10} + n_{ID} \quad (7)$$

$c_{init}$ represents initialization information; $n_{RNTI}$ corresponds to an RNTI associated with PUSCH transmission; $n_{preamble-ID}$ represents a preamble index, a value range thereof being $n_{preamble-ID} \in \{0, 1, \ldots, 63\}$; a value of nip is within a first preset value range under a condition of satisfying a first preset condition, and corresponds to a cell identifier under a condition of not satisfying the first preset condition; and a maximum value within the first preset value range is 1023.

As an implementation mode, the case where nip satisfies a first preset condition includes: specific fields in high-layer RRC signaling (specifically, for example, a field dataScramblingIdentityPDSCH) are configured, an RNTI is equal to C-RNTI, MCS-C-RNTI or CS-RNTI, and it is determined that $n_{ID}$ satisfies the first preset condition when transmission is not scheduled by a DCI format 1_0 in a common search space, and $n_{ID} \in \{0, 1, \ldots, 1023\}$. Accordingly, in other cases, it is determined that $n_{ID}$ does not satisfy the first preset condition, and $n_{ID}=N_{cell}^{ID}$, where $N_{cell}^{ID}$ is a cell ID.

As a fourth implementation mode, the method further includes that: the terminal scrambles an uplink DM-RS based on the initialization information; and the terminal sends the scrambled uplink DM-RS to the network device based on the initialization information.

As an example, the first information is a preamble index. The operation that the terminal determines initialization information for scrambling at least based on the first information includes that: the terminal determines initialization information for scrambling based on a fifth parameter and the preamble index. The fifth parameter includes the number of slots in one frame for transmitting an uplink DM-RS and/or the number of OFDM symbols in a slot for transmitting an uplink DM-RS.

Specifically, the initialization information satisfies:

$$c_{init}=(2^{17}(N_{symb}^{slot}n_{s,f}^{\mu}+l+1)(2N_{ID}^{nSCID}+1)+ 2^q N_{preamble-ID}+2N_{ID}^{nSCID}+n_{SCID}) \bmod 2^{31} \quad (8)$$

$c_{init}$ represents initialization information; l represents the number of OFDM symbols in a slot for transmitting an uplink DM-RS; $n_{s,f}^{\mu}$ represents the number of slots in one frame for transmitting an uplink DM-RS; $N_{preamble-ID}$ represents a preamble index; $n_{SCID}$ represents a scrambling identifier; $N_{symb}^{slot}$ represents the number of symbols in one slot, $N_{preamble-ID} \in \{0, 1, \ldots, 63\}$; $q \in \{2, 3, \ldots, 16\}$, any positive integer value in the above set may be taken; a value of $N_{ID}^{nSCID}$ is within a third preset value range under a condition of satisfying a third preset condition, and corresponds to a cell identifier under a condition of not satisfying the third preset condition; and mod represents a modulo operation.

As an implementation mode, the case where $N_{ID}^{nSCID}$ satisfies a third preset condition includes: if high-layer signaling is configured and the PUSCH is scheduled by a DCI format 0_1 or transmitted using a configured grant, $N_{ID}^0$, $N_{ID}^1 \in \{0, 1, \ldots, 65535\}$, where the values of $N_{ID}^0$ and $N_{ID}^1$ are respectively configured by fields scramblingID0 and scramblingID1 in high-layer signaling DMRS-UplinkConfig.

If high-layer signaling is configured and the PDSCH is scheduled by a PDCCH DCI format 0_1 scrambled with a CRC using C-RNTI, MCS-C-RNTI or CS-RNTI, $N_{ID}^0 \in \{0, 1, \ldots, 65535\}$, where the value of is configured by the field scrambling ID0 in the high-layer signaling DMRS-UplinkConfig.

The case where $N_{ID}^{nSCID}$ satisfies the second preset condition includes: in any case other than the above, $N_{ID}^{nSCID}=N_{ID}^{cell}$ where, where $N_{ID}^{cell}$ represents a cell identifier.

If DCI format 0_1 is used, $n_{SCID} \in \{0, 1\}$, where the value of $n_{SCID}$ is configured by a DM-RS sequence initialization field in a DCI field or high-layer signaling dmrs-SeqInitialization, otherwise, if DCI format 1_1 is not used, $n_{SCID}=0$.

By adopting the technical solutions of the embodiments of the present application, through first information associated with a transmission point, an MIMO data layer of the transmission point, a codeword transmitted from the transmission point, a data channel transmitted from the transmission point, or a preamble, initialization information for scrambling is determined based on the first information. On one hand, different pieces of initialization information are used for different MIMO data layers aiming at different transmission points or the same transmission point or the codeword transmitted from the transmission point or the data channel transmitted from the transmission point, so that the interference between data streams is greatly reduced. On the other hand, for two-step random access, different pieces of initialization information are used for different preamble codes, and the detection or demodulation performance of the PUSCH in the two-step random access process is improved.

Figure 3:
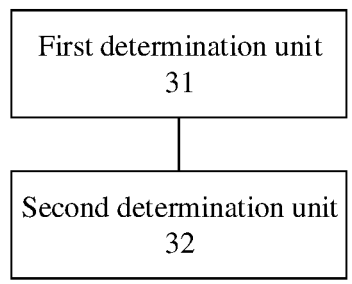
FIG. 3 is a schematic composition structure diagram of a network device according to embodiments of the present application.

Embodiments of the present application also provide a network device. FIG. 3 is a schematic composition structure diagram of a network device according to embodiments of the present application. As shown in FIG. 3, the network device includes: a first determination unit 31 and a second determination unit 32.

The first determination unit 31 is configured to determine first information that is associated with at least one of the following information: a transmission point, an MIMO data layer of the transmission point, a codeword transmitted by the transmission point, a data channel transmitted by the transmission point, and a preamble.

The second determination unit 32 is configured to determine initialization information for scrambling at least based on the first information.

Figure 4:
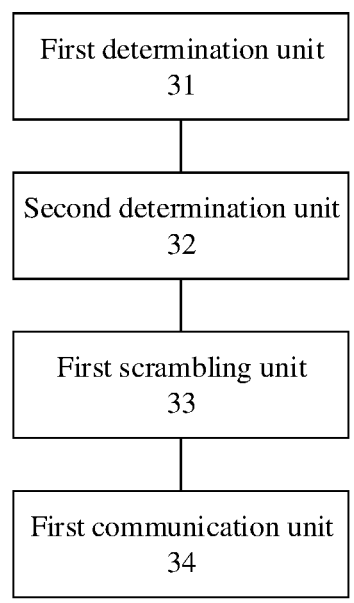
FIG. 4 is another schematic composition structure diagram of a network device according to embodiments of the present application.

In an embodiment of the present application, as shown in FIG. 4, the network device further includes a first scrambling unit 33 and a first communication unit 34.

The first scrambling unit 33 is configured to scramble a PDSCH based on the initialization information.

The first communication unit 34 is configured to send the scrambled PDSCH to a terminal based on the initialization information.

In an embodiment of the present application, the initialization information is represented by a polynomial form of weighted sums of different powers of 2.

The initialization information satisfies:

$$c_{init}=n_{N-1} \cdot 2^{N-1}+n_{N-2} \cdot 2^{N-2}+ \ldots +n_0 \cdot 2^0=\Sigma_{i=1}^{N} n_{i-1} \cdot 2^{i-1}$$

$n_{i-1} \in \{0, 1, \ldots, Q_{i-1}\}$, $Q_{i-1}$ is a positive integer, and $n_{i-1}$ takes a value from a set consisting of hexadecimal numbers, decimal numbers, octal numbers, or binary numbers; specific values of Q corresponding to different i are the same or different; system representations of Q corresponding to different i are the same or different; and $N \in Z^+$ represents that a value is taken from a set of positive integers.

As an implementation mode, the first information is an MIMO data layer index.

The second determination unit 32 is configured to determine initialization information for scrambling based on a first parameter, a codeword index, an MIMO data layer index, and a second parameter. The first parameter corresponds to an RNTI associated with PDSCH transmission, and the second parameter is a specific value.

Specifically, the initialization information satisfies:

$$c_{init}=n_{RNTI} \cdot 2^{15}+q \cdot 2^{14}+l \cdot 2^{13}+n_{ID}$$

$c_{init}$ represents initialization information; $n_{RNTI}$ corresponds to an RNTI associated with PDSCH transmission; q represents a codeword index; l represents an MIMO data layer index; a value of $n_{ID}$ is within a first preset value range under a condition of satisfying a first preset condition, and corresponds to a cell identifier under a condition of not satisfying the first preset condition; and a maximum value within the first preset value range is 1023.

As another implementation mode, the first information is a second parameter having a value within a second preset value range, and a maximum value within the second preset value range is a positive integer greater than 1023.

The second determination unit 32 is configured to determine initialization information for scrambling based on a first parameter, a codeword index, and a second parameter. The first parameter corresponds to an RNTI associated with PDSCH transmission.

Specifically, the initialization information satisfies:

$$c_{init}=n_{RNTI} \cdot 2^{15}+q \cdot 2^{14}+n_{ID}$$

$c_{init}$ represents initialization information; $n_{RNTI}$ corresponds to an RNTI associated with PDSCH transmission; q represents a codeword index; and a value of $n_{ID}$ s is within the second preset value range under a condition of satisfying a first preset condition, and corresponds to a cell identifier under a condition of not satisfying the first preset condition.

In an alternative embodiment of the present application, as shown in FIG. 4, the network device further includes a first scrambling unit 33 and a first communication unit 34.

The first scrambling unit 33 is configured to scramble a downlink DM-RS based on the initialization information.

The first communication unit 34 is configured to send the scrambled downlink DM-RS to a terminal based on the initialization information.

As an implementation mode, the first information is an MIMO data layer index. The second determination unit 32 is configured to determine initialization information for scrambling based on a third parameter and the MIMO data layer index. The third parameter includes the number of slots in one frame for transmitting a downlink DM-RS and/or the number of OFDM symbols in a slot for transmitting a downlink DM-RS.

Specifically, the initialization information satisfies:

$$c_{init}=(2^{17}(N_{symb}^{slot}n_{s,f}^{\mu}+l+1)(2N_{ID}^{nSCID}+1)+ 2^q N_{layer-ID}+2N_{ID}^{nSCID}+n_{SCID}) \bmod 2^{31}$$

$c_{init}$ represents initialization information; l represents the number of OFDM symbols in a slot for transmitting a downlink DM-RS; $n_{s,f}^{\mu}$ represents the number of slots in one frame for transmitting a downlink DM-RS; $N_{layer-ID}$ represents an MIMO data layer index or a codeword identifier or a data channel index transmitted from the slot transmission point; $n_{SCID}$ represents a scrambling identifier; $N_{symb}^{slot}$ represents the number of symbols in one slot; and a value of $N_{ID}^{nSCID}$ is within a third preset value range under a condition of satisfying a second preset condition, and corresponds to a cell identifier under a condition of not satisfying the second preset condition.

Figure 5:
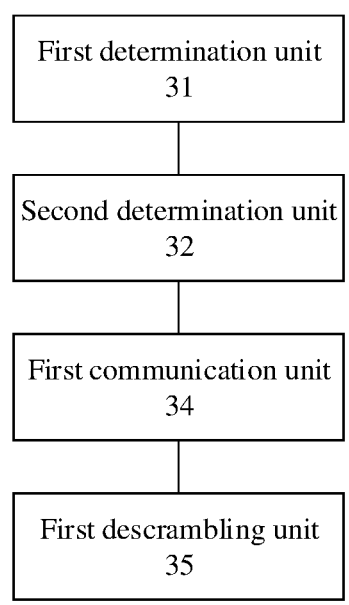
FIG. 5 is yet another schematic composition structure diagram of a network device according to embodiments of the present application.

In an alternative embodiment of the present application, as shown in FIG. 5, the network device further includes a first communication unit 34 and a first descrambling unit 35.

The first communication unit 34 is configured to receive a PUSCH transmitted by a terminal.

The first descrambling unit 35 is configured to descramble the PUSCH based on the initialization information.

As an implementation mode, the first information is a preamble index. The second determination unit 32 is configured to determine initialization information for scrambling based on a fourth parameter, a second parameter, and the preamble index. The fourth parameter corresponds to an RNTI associated with PUSCH transmission, and the second parameter is a specific value.

Specifically, the initialization information satisfies:

$$c_{init}=n_{RNTI} \cdot 2^{15}+n_{ID} \cdot 2^{10}+n_{preamble-ID}$$

or satisfies: $c_{init}=n_{RNTI} \cdot 2^{15}+n_{ID} \cdot 2^{14}+n_{preamble-ID}$, or satisfies: $c_{init}=n_{RNTI} \cdot 2^{15}+n_{preamble-ID} \cdot 2^{14}+n_{ID}$, or satisfies: $c_{init}=n_{RNTI} \cdot 2^{15}+n_{preamble-ID} \cdot 2^{10}+n_{ID}$, $c_{init}$ represents initialization information; $n_{RNTI}$ corresponds to an RNTI associated with PUSCH transmission; $n_{preamble-ID}$ represents a preamble index; a value of $n_{ID}$ is within a first preset value range under a condition of satisfying a first preset condition, and corresponds to a cell identifier under a condition of not satisfying the first preset condition; and a maximum value within the first preset value range is 1023.

In an alternative embodiment of the present application, as shown in FIG. 5, the network device further includes a first communication unit 34 and a first descrambling unit 35.

The first communication unit 34 is configured to receive an uplink DM-RS transmitted by a terminal.

The first descrambling unit 35 is configured to descramble the uplink DM-RS based on the initialization information.

As an implementation mode, the first information is a preamble index. The second determination unit 32 is configured to determine initialization information for scrambling based on a fifth parameter and the preamble index. The fifth parameter includes the number of slots in one frame for transmitting an uplink DM-RS and/or the number of OFDM symbols in a slot for transmitting an uplink DM-RS.

Specifically, the initialization information satisfies:

$$c_{init}=(2^{17}(N_{symb}^{slot}n_{s,f}^{\mu}+l+1)(2N_{ID}^{nSCID}+1)+ 2^q N_{preamble-ID}+2N_{ID}^{nSCID}+n_{SCID}) \bmod 2^{31}$$

$c_{init}$ represents initialization information; l represents the number of OFDM symbols in a slot for transmitting an uplink DM-RS; $n_{s,f}^{\mu}$ represents the number of slots in one frame for transmitting an uplink DM-RS; $N_{preamble-ID}$ represents a preamble index; $n_{SCID}$ represents a scrambling identifier; $N_{symb}^{slot}$ represents the number of symbols in one slot; and a value of $N_{ID}^{nSCID}$ is within a third preset value range under a condition of satisfying a third preset condition, and corresponds to a cell identifier under a condition of not satisfying the third preset condition.

In the embodiments of the present application, the first determination unit 31, the second determination unit 32, the first scrambling unit 33 and the first descrambling unit 35 in the network device may be implemented by a Central Processing Unit (CPU), a Digital Signal Processor (DSP), a Microcontroller Unit (MCU) or a Field-Programmable Gate Array (FPGA) in the terminal in practice. The first communication unit 34 in the network device may be implemented by a communication module (including: basic communication suites, operating systems, communication modules, standardized interfaces and protocols, etc.) and a transceiver antenna in practice.

It should be noted that the network device provided by the above embodiments is only exemplified by the division of the above program modules when performing scrambling information processing. In practice, the above-mentioned processing distribution may be completed by different program modules as required, i.e., the internal structure of the network device is divided into different program modules to complete all or part of the above-described processing. In addition, the network device provided by the above embodiment and the embodiment of the scrambling information processing method belong to the same concept, and the detailed implementation process thereof is detailed in the method embodiment and will be omitted herein.

Figure 6:
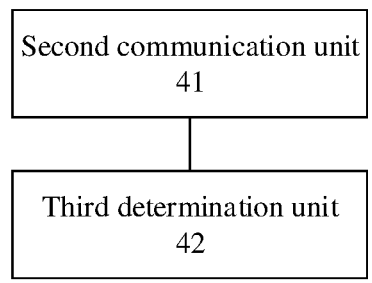
FIG. 6 is a schematic composition structure diagram of a terminal according to embodiments of the present application.

Embodiments of the present application also provide a terminal. FIG. 6 is a schematic composition structure diagram of a terminal according to an embodiment of the present application. As shown in FIG. 6, the terminal includes a second communication unit 41 and a third determination unit 42.

The second communication unit 41 is configured to obtain first information configured by a network device. The first information is associated with at least one of the following information: a transmission point, an MIMO data layer of the transmission point, a codeword transmitted by the transmission point, a data channel transmitted by the transmission point, and a preamble.

The third determination unit 42 is configured to determine initialization information for scrambling at least based on the first information.

Figure 7:
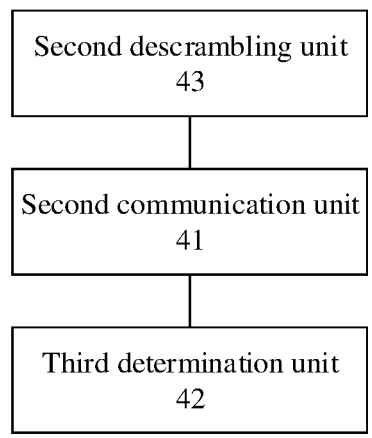
FIG. 7 is another schematic composition structure diagram of a terminal according to embodiments of the present application.

In an alternative embodiment of the present application, as shown in FIG. 7, the terminal further includes a second descrambling unit 43.

The second communication unit 41 is further configured to receive a PDSCH sent by the network device.

The second descrambling unit 43 is configured to descramble the PDSCH based on the initialization information.

In an embodiment of the present application, the initialization information is represented by a polynomial form of weighted sums of different powers of 2.

The initialization information satisfies:

$$c_{init} = n_{N-1} \cdot 2^{N-1} + n_{N-2} \cdot 2^{N-2} + \cdots + n_0 \cdot 2^0 = \sum_{i=1}^{N} n_{i-1} \cdot 2^{i-1}$$

$n_{i-1} \in \{0, 1, \ldots, Q_{i-1}\}$, $Q_{i-1}$ is a positive integer, and $n_{i-1}$ takes a value from a set consisting of hexadecimal numbers, decimal numbers, octal numbers, or binary numbers; specific values of Q corresponding to different i are the same or different; system representations of Q corresponding to different i are the same or different; and $N \in Z^+$ represents that a value is taken from a set of positive integers.

As an implementation mode, the first information is an MIMO data layer index. The third determination unit 42 is configured to determine initialization information for scrambling based on a first parameter, a codeword index, an MIMO data layer index, and a second parameter. The first parameter corresponds to an RNTI associated with PDSCH transmission, and the second parameter is a specific value.

Specifically, the initialization information satisfies:

$$c_{init} = n_{RNTI} \cdot 2^{15} + q \cdot 2^{14} + l \cdot 2^{13} + n_{ID}$$

$c_{init}$ represents initialization information; $n_{RNTI}$ corresponds to an RNTI associated with PDSCH transmission; q represents a codeword index; l represents an MIMO data layer index; a value of $n_{ID}$ is within a first preset value range under a condition of satisfying a first preset condition, and corresponds to a cell identifier under a condition of not satisfying the first preset condition; and a maximum value within the first preset value range is 1023.

As another implementation mode, the first information is a second parameter having a value within a second preset value range, and a maximum value within the second preset value range is a positive integer greater than 1023.

The third determination unit 42 is configured to determine initialization information for scrambling based on a first parameter, a codeword index, and a second parameter. The first parameter corresponds to an RNTI associated with PDSCH transmission.

Specifically, the initialization information satisfies:

$$c_{init} = n_{RNTI} \cdot 2^{15} + q \cdot 2^{14} + n_{ID}$$

$c_{init}$ represents initialization information; $n_{RNTI}$ corresponds to an RNTI associated with PDSCH transmission; q represents a codeword index; and a value of $n_{ID}$ is within the second preset value range under a condition of satisfying a first preset condition, and corresponds to a cell identifier under a condition of not satisfying the first preset condition.

In an alternative embodiment of the present application, the second communication unit 41 is further configured to receive a downlink DM-RS sent by the network device, and descramble the downlink DM-RS based on the initialization information.

As an implementation mode, the first information is an MIMO data layer index. The third determination unit 42 is configured to determine initialization information for scrambling based on a third parameter and the MIMO data layer index. The third parameter includes the number of slots in one frame for transmitting a downlink DM-RS and/or the number of OFDM symbols in a slot for transmitting a downlink DM-RS.

Specifically, the initialization information satisfies:

$$c_{init} = (2^{17}(N_{symb}^{slot} n_{s,f}^{\mu} + l + 1)(2N_{ID}^{nSCID} + 1) + 2^q N_{layer-ID} + 2N_{ID}^{nSCID} + n_{SCID}) \bmod 2^{31}$$

$c_{init}$ represents initialization information; l represents the number of OFDM symbols in a slot for transmitting a downlink DM-RS; $n_{s,f}^{\mu}$ represents the number of slots in one frame for transmitting a downlink DM-RS; $N_{layer-ID}$ represents an MIMO data layer index or a codeword identifier or a data channel index transmitted from the transmission point; $n_{SCID}$ represents a scrambling identifier; $N_{symb}^{slot}$ represents the number of symbols in one slot; and a value of $N_{ID}^{nSCID}$ is within a third preset value range under a condition of satisfying a second preset condition, and corresponds to a cell identifier under a condition of not satisfying the second preset condition.

Figure 8:
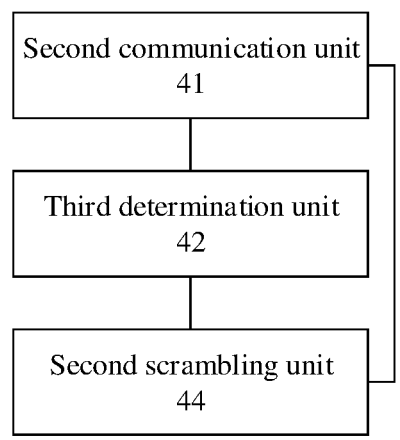
FIG. 8 is yet another schematic composition structure diagram of a terminal according to embodiments of the present application.

In an alternative embodiment of the present application, as shown in FIG. 8, the terminal further includes a second scrambling unit 44, configured to scramble a PUSCH based on the initialization information.

The second communication unit 41 is further configured to send the scrambled PUSCH to the network device based on the initialization information.

As an implementation mode, the first information is a preamble index. The third determination unit 42 is configured to determine initialization information for scrambling based on a fourth parameter, a second parameter, and the preamble index. The fourth parameter corresponds to an RNTI associated with PUSCH transmission, and the second parameter is a specific value.

Specifically, the initialization information satisfies:

$$c_{init} = n_{RNTI} \cdot 2^{15} + n_{ID} \cdot 2^{10} + n_{preamble-ID}$$

$$c_{init} = n_{RNTI} \cdot 2^{15} + n_{ID} \cdot 2^{10} + n_{preamble-ID}$$

or satisfies: $c_{init} = n_{RNTI} \cdot 2^{15} + n_{ID} \cdot 2^{14} + n_{preamble-ID}$, or satisfies: $c_{init} = n_{RNTI} \cdot 2^{15} + n_{preamble-ID} \cdot 2^{14} + n_{ID}$, or satisfies: $c_{init} = n_{RNTI} \cdot 2^{15} + n_{preamble-ID} \cdot 2^{10} + n_{ID}$, $c_{init}$ represents initialization information; $n_{RNTI}$ corresponds to an RNTI associated with PUSCH transmission; $n_{preamble-ID}$ represents a preamble index; a value of nip is within a first preset value range under a condition of satisfying a first preset condition, and corresponds to a cell identifier under a condition of not satisfying the first preset condition; and a maximum value within the first preset value range is 1023.

In an alternative embodiment of the present application, as shown in FIG. 8, the terminal further includes a second scrambling unit 44, configured to scramble an uplink DM-RS based on the initialization information.

The second communication unit 41 is further configured to send the scrambled uplink DM-RS to the network device based on the initialization information.

As an implementation mode, the first information is a preamble index.

The third determination unit 42 is configured to determine initialization information for scrambling based on a fifth parameter and the preamble index. The fifth parameter includes the number of slots in one frame for transmitting an uplink DM-RS and/or the number of OFDM symbols in a slot for transmitting an uplink DM-RS.

Specifically, the initialization information satisfies:

$$c_{init} = (2^{17}(N_{symb}^{slot} n_{s,f}^{\mu} + l + 1)(2N_{ID}^{nSCID} + 1) + 2^q N_{layer\text{-}ID} + 2N_{ID}^{nSCID} + n_{SCID}) \bmod 2^{31}$$

where $c_{init}$ represents initialization information; l represents the number of OFDM symbols in a slot for transmitting an uplink DM-RS; $n_{s,f}^{\mu}$ represents the number of slots in one frame for transmitting an uplink DM-RS; $N_{preamble\text{-}ID}$ represents a preamble index; $n_{SCID}$ represents a scrambling identifier; $N_{symb}^{slot}$ represents the number of symbols in one slot; and a value of $N_{ID}^{nSCID}$ is within a third preset value range under a condition of satisfying a third preset condition, and corresponds to a cell identifier under a condition of not satisfying the third preset condition.

In the embodiments of the present application, the third determination unit 42, the second scrambling unit 44 and the second descrambling unit 43 in the terminal may be implemented by a CPU, a DSP, an MCU or an FPGA in the terminal in practice. The second communication unit 41 in the terminal may be implemented by a communication module (including: basic communication suites, operating systems, communication modules, standardized interfaces and protocols, etc.) and a transceiver antenna in practice.

It should be noted that the terminal provided by the above embodiments is only exemplified by the division of the above program modules when performing scrambling information processing. In practice, the above-mentioned processing distribution may be completed by different program modules as required, i.e., the internal structure of the terminal is divided into different program modules to complete all or part of the above-described processing. In addition, the terminal provided by the above embodiment and the embodiment of the scrambling information processing method belong to the same concept, and the detailed implementation process thereof is detailed in the method embodiment and will be omitted herein.

Figure 9:
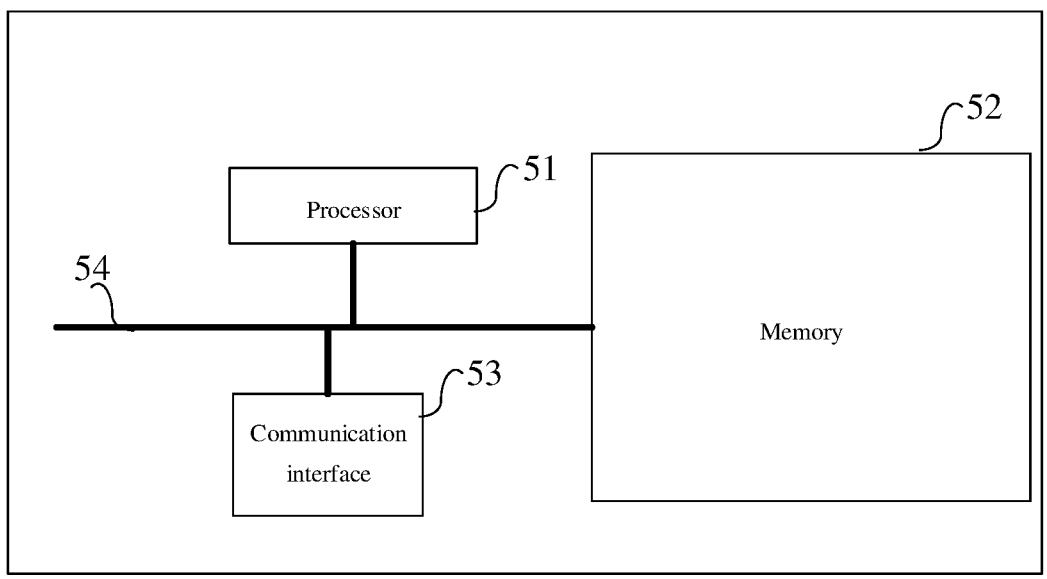
FIG. 9 is a schematic hardware composition structure diagram of a communication device according to embodiments of the present application.

Embodiments of the present application also provide a communication device. FIG. 9 is a schematic hardware composition structure diagram of a communication device according to an embodiment of the present application. As shown in FIG. 9, the communication device includes a memory 52, a processor 51, and a computer program stored on the memory 52 and operable on the processor 51. Alternatively, the communication device is a network device, and the processor, when executing the program, implements the steps of the scrambling information processing method to which the embodiments of the present application are applied in the network device. Alternatively, the communication device is a terminal, and the processor, when executing the program, performs the steps of the scrambling information processing method to which the embodiments of the present application are applied in the terminal.

It can be understood that a communication interface 53 is also included in the communication device. The various components in the device may be coupled together by a bus system 54. It can be understood that the bus system 54 is configured to implement connection and communication between the components. The bus system 54 includes a data bus, a power bus, a control bus, and a status signal bus. However, for the sake of clarity, various buses are marked as the bus system 54 in FIG. 9.

It can be understood that the memory 52 may be a volatile memory or a non-volatile memory, or may include both volatile and non-volatile memories. The non-volatile memory may be a Read Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, an optical disk, or a Compact Disc-ROM (CD-ROM). The magnetic surface memory may be a magnetic disk memory or a magnetic tape memory. The volatile memory may be a Random Access Memory (RAM), which is used as an external cache. By way of example, but not limitation, many forms of RAM are available, such as a Static RAM (SRAM), a Synchronous SRAM (SSRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 52 described in the embodiments of the present application is intended to include, but not limited to, these and any other suitable types of memory.

The methods disclosed in the embodiments of the present application described above may be applied to the processor 51 or implemented by the processor 51. The processor 51 may be an integrated circuit chip with signal processing capabilities. In an implementation process, each step of the above method may be completed by using an integrated logic circuit of hardware in the processor 51 or an instruction in a software form. The processor 51 described above may be a general purpose processor, a DSP, or other programmable logic devices, discrete gates or transistor logic devices, discrete hardware components, etc. Various methods, steps, and logic block diagrams disclosed in the embodiments of the present application may be implemented or executed by the processor 51. The general purpose processor may be a microprocessor or any conventional processor, etc. The steps of the method disclosed in combination with the embodiment of the present application may be directly embodied as a hardware decoding processor for execution and completion, or a combination of hardware and software modules in the decoding processor for execution and completion. The software module may be located in a storage medium, which is located in the memory 52, and the processor 51 reads information in the memory 52, and completes the steps of the foregoing methods in combination with hardware.

Embodiments of the present application also provide a communication system, which includes a network device and a terminal. The terminal may be used for realizing corresponding functions realized by the terminal in the above method, and the network device may be used for realizing corresponding functions realized by the network device in the above method. For the sake of brevity, descriptions thereof are omitted herein.

The technical solutions of the embodiments of the present application may be applied to various communication systems, such as a Global System of Mobile communication (GSM), an LTE system or a 5G system. The 5G system may also be referred to as an NR system. The network device may be an access network device in the communication system, such as a base station under each communication system.

Embodiments of the present application also provide a computer-readable storage medium, which has a computer program stored thereon that, when executed by a processor, implements the steps of a scrambling information processing method applied to a network device according to the embodiment of the present application, or implements the steps of a scrambling information processing method applied to a terminal according to the embodiment of the present application.

In some embodiments provided by the present application, it should be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the present application may be integrated into a processing unit, each unit may also serve as an independent unit and two or more than two units may also be integrated into a unit. The integrated unit may be implemented in a hardware form and may also be implemented in form of hardware and software functional unit.

Those of ordinary skill in the art can understand that all or part of the steps of the above method embodiments may be completed by a program instructing related hardware. The foregoing program may be stored in a computer-readable storage medium. When the program is executed, the steps of the above method embodiments are performed. The foregoing storage medium includes: various media capable of storing program codes such as a mobile storage device, a ROM, a RAM, a magnetic disk, or an optical disk.

Or, the integrated unit of the present application may also be stored in a computer-readable storage medium if being implemented in the form of a software functional module and sold or used as a standalone product. Based on such an understanding, the technical solutions of the present application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the present application. The foregoing storage medium includes: various media capable of storing program codes such as a mobile storage device, a ROM, a RAM, a magnetic disk, or an optical disk.

The methods disclosed in the several method embodiments provided by the present application may be combined arbitrarily without conflict to obtain a new method embodiment.

The features disclosed in the several product embodiments provided by the present application may be combined arbitrarily without conflict to obtain a new product embodiment.

The features disclosed in the several method or device embodiments provided by the present application may be combined arbitrarily without conflict to obtain a new method or device embodiment.

The above is only the specific implementation mode of the present application and not intended to limit the scope of protection of the present application. Any variations or replacements apparent to those skilled in the art within the technical scope disclosed by the present application shall fall within the scope of protection of the present application. Therefore, the scope of protection of the present application should be subject to the scope of protection of the claims.

The invention claimed is:

1. A scrambling information processing method, comprising:
   determining, by a network device, first information, the first information being associated with at least a preamble;
   determining, by the network device, initialization information for scrambling at least based on the first information;
   receiving, by the network device, a Physical Uplink Shared Channel (PUSCH) transmitted by a terminal; and
   descrambling, by the network device, the PUSCH based on the initialization information,
   wherein the first information comprises a preamble index,
   wherein the determining, by the network device, the initialization information for scrambling at least based on the first information comprises:
   determining, by the network device, the initialization information for scrambling based on a fourth parameter, a second parameter, and the preamble index, the fourth parameter corresponding to a Radio Network Temporary Identity (RNTI) associated with PUSCH transmission, and the second parameter being a specific value, wherein the specific value of the second parameter is within a first preset value range under a condition of satisfying a first preset condition, and corresponds to a cell identifier under a condition of not satisfying the first preset condition; and a maximum value within the first preset value range is 1023.

2. The method according to claim 1, further comprising:
   scrambling, by the network device, a Physical Downlink Shared Channel (PDSCH) based on the initialization information; and
   sending, by the network device, the scrambled PDSCH to the terminal based on the initialization information.

3. The method according to claim 2, wherein the first information further comprises the second parameter having a value within a second preset value range, and a maximum value within the second preset value range is a positive integer greater than 1023;
   the determining, by the network device, the initialization information for scrambling at least based on the first information comprises:
   determining, by the network device, the initialization information for scrambling based on a first parameter, a codeword index, and the second parameter, the first parameter corresponding to an RNTI associated with PDSCH transmission.

4. The method according to claim 3, wherein the initialization information satisfies:

$$c_{init}=n_{RNTI}\cdot 2^{15}+q\cdot 2^{14}+n_{ID},$$

wherein $c_{init}$ represents the initialization information; $n_{RNTI}$ corresponds to the RNTI associated with PDSCH transmission; q represents the codeword index; and a value of $n_{ID}$ is within the second preset value range under the condition of satisfying the first preset condition, and corresponds to the cell identifier under the condition of not satisfying the first preset condition.

5. The method according to claim 1, wherein the initialization information is represented by a polynomial form of weighted sums of different powers of 2, and the initialization information satisfies:

$$c_{init} = n_{N-1}\cdot 2^{N-1} + n_{N-2}\cdot 2^{N-2} + \cdots + n_0\cdot 2^0 = \sum_{i=1}^{N} n_{i-1}\cdot 2^{i-1},$$

wherein $n_{i-1}\in\{0,1,\ldots,Q_{i-1}\}$, $Q_{i-1}$ is a positive integer, and $n_{i-1}$ takes a value from a set consisting of hexadecimal numbers, decimal numbers, octal numbers, or binary numbers; specific values of Q corresponding to different i are the same or different; system representations of Q corresponding to different i are the same or different; and $N\in Z^+$ represents that a value is taken from a set of positive integers.

6. The method according to claim 2, wherein the first information further comprises a Multiple-Input Multiple-Output (MIMO) data layer index; and
the determining, by the network device, the initialization information for scrambling at least based on the first information comprises:
determining, by the network device, the initialization information for scrambling based on a first parameter, a codeword index, the MIMO data layer index, and the second parameter, the first parameter corresponding to an RNTI associated with PDSCH transmission.

7. The method according to claim 6, wherein the initialization information satisfies:

$$c_{init}=n_{RNTI}\cdot 2^{15}+q\cdot 2^{14}+l\cdot 2^{13}+n_{ID},$$

wherein $c_{init}$ represents the initialization information; $n_{RNTI}$ corresponds to the RNTI associated with PDSCH transmission; q represents the codeword index; l represents the MIMO data layer index; a value of $n_{ID}$ is within the first preset value range under the condition of satisfying the first preset condition, and corresponds to the cell identifier under the condition of not satisfying the first preset condition.

8. The method according to claim 1, wherein the initialization information satisfies:

$$c_{init}=n_{RNTI}\cdot 2^{15}+n_{ID}\cdot 2^{10}+n_{preamble-ID},$$

or satisfies: $c_{init}=n_{RNTI}\cdot 2^{15}+n_{ID}\cdot 2^{14}+n_{preamble-ID},$ or satisfies: $c_{init}=n_{RNTI}\cdot 2^{15}+n_{preamble-ID}\cdot 2^{14}+n_{ID},$ or satisfies: $c_{init}=n_{RNTI}\cdot 2^{15}+n_{preamble-ID}\cdot 2^{10}+n_{ID},$ wherein $c_{init}$ represents the initialization information; $n_{RNTI}$ corresponds to the RNTI associated with PUSCH transmission; $n_{preamble-ID}$ represents the preamble index; a value of $n_{ID}$ is within the first preset value range under the condition of satisfying the first preset condition, and corresponds to the cell identifier under the condition of not satisfying the first preset condition.

9. The method according to claim 1, wherein the determining, by the network device, the initialization information for scrambling at least based on the first information further comprises:
directly determining, by the network device, the initialization information for scrambling based on the fourth parameter, the second parameter, and the preamble index.

10. A scrambling information processing method, comprising:
obtaining, by a terminal, first information configured by a network device, the first information being associated with at least a preamble;
determining, by the terminal, initialization information for scrambling at least based on the first information;
scrambling, by the terminal, a Physical Uplink Shared Channel (PUSCH) based on the initialization information; and
sending, by the terminal, the scrambled PUSCH to the network device based on the initialization information,
wherein the first information comprises a preamble index,
wherein the determining, by the terminal, the initialization information for scrambling at least based on the first information comprises:
determining, by the terminal, the initialization information for scrambling based on a fourth parameter, a second parameter, and the preamble index, the fourth parameter corresponding a Radio Network Temporary Identity (RNTI) associated with PUSCH transmission, and the second parameter being a specific value, wherein the specific value of the second parameter is within a first preset value range under a condition of satisfying a first preset condition, and corresponds to a cell identifier under a condition of not satisfying the first preset condition; and a maximum value within the first preset value range is 1023.

11. The method according to claim 10, further comprising:
receiving, by the terminal, a Physical Downlink Shared Channel (PDSCH) sent by the network device, and descrambling the PDSCH based on the initialization information.

12. The method according to claim 11, wherein the first information further comprises a Multiple-Input Multiple-Output (MIMO) data layer index; and
the determining, by the terminal, the initialization information for scrambling at least based on the first information comprises:
determining, by the terminal, the initialization information for scrambling based on a first parameter, a codeword index, the MIMO data layer index, and the second parameter, the first parameter corresponding to an RNTI associated with PDSCH transmission.

13. The method according to claim 12, wherein the initialization information satisfies:

$$c_{init}=n_{RNTI}\cdot 2^{15}+q\cdot 2^{14}+l\cdot 2^{13}+n_{ID},$$

wherein $c_{init}$ represents the initialization information; $n_{RNTI}$ corresponds to the RNTI associated with PDSCH transmission; q represents the codeword index; l represents the MIMO data layer index; a value of $n_{ID}$ is within the first preset value range under the condition of satisfying the first preset condition, and corresponds to the cell identifier under the condition of not satisfying the first preset condition.

14. The method according to claim 10, wherein the initialization information is represented by a polynomial form of weighted sums of different powers of 2, and
the initialization information satisfies:

$$c_{init} = n_{N-1} \cdot 2^{N-1} + n_{N-2} \cdot 2^{N-2} + \cdots + n_0 \cdot 2^0 = \sum_{i=1}^{N} n_{i-1} \cdot 2^{i-1},$$

wherein $n_{i-1} \in \{0,1,\ldots,Q_{i-1}\}$, $Q_{i-1}$ is a positive integer, and $n_{i-1}$ takes a value from a set consisting of hexadecimal numbers, decimal numbers, octal numbers, or binary numbers;
specific values of Q corresponding to different i are the same or different; system representations of Q corresponding to different i are the same or different; and $N \in Z^+$ represents that a value is taken from a set of positive integers.

15. The method according to claim 10, wherein the initialization information satisfies:

$c_{init} = n_{RNTI} \cdot 2^{15} + n_{ID} \cdot 2^{10} + n_{preamble-ID}$, or satisfies: $c_{init} = n_{RNTI} \cdot 2^{15} + n_{ID} \cdot 2^{14} + n_{preamble-ID}$, or satisfies: $c_{init} = n_{RNTI} \cdot 2^{15} + n_{preamble-ID} \cdot 2^{14} + n_{ID}$, or satisfies: $c_{init} = n_{RNTI} \cdot 2^{15} + n_{preamble-ID} \cdot 2^{10} + n_{ID}$, wherein $c_{init}$ represents the initialization information; $n_{RNTI}$ corresponds to the RNTI associated with PUSCH transmission; $n_{preamble-ID}$ represents the preamble index; a value of $n_{ID}$ is within the first preset value range under the condition of satisfying the first preset condition, and corresponds to the cell identifier under the condition of not satisfying the first preset condition.

16. The method according to claim 10, wherein the determining, by the terminal, the initialization information for scrambling at least based on the first information further comprises:
directly determining, by the terminal, the initialization information for scrambling based on the fourth parameter, the second parameter, and the preamble index.

17. A non-transitory computer-readable storage medium, having a computer program stored thereon, when the computer program is executed by a processor, the processor is configured to perform:
obtaining first information configured by a network device, the first information being associated with at least-a preamble;
determining initialization information for scrambling at least based on the first information;
scrambling a Physical Uplink Shared Channel (PUSCH) based on the initialization information; and
sending the scrambled PUSCH to the network device based on the initialization information,
wherein the first information comprises a preamble index, wherein the determining the initialization information for scrambling at least based on the first information comprises:
determining the initialization information for scrambling based on a fourth parameter, a second parameter, and the preamble index, the fourth parameter corresponding a Radio Network Temporary Identity (RNTI) associated with PUSCH transmission, and the second parameter being a specific value, wherein the specific value of the second parameter is within a first preset value range under a condition of satisfying a first preset condition, and corresponds to a cell identifier under a condition of not satisfying the first preset condition; and a maximum value within the first preset value range is 1023.

18. The non-transitory computer-readable storage medium according to claim 17, wherein the determining the initialization information for scrambling at least based on the first information further comprises:
directly determining the initialization information for scrambling based on the fourth parameter, the second parameter, and the preamble index.

19. A terminal, comprising: a memory, a processor, and a computer program stored on the memory and operable on the processor, wherein the processor, when executing the computer program, is configured to:
obtain first information configured by a network device, the first information being associated with at least-a preamble;
determine initialization information for scrambling at least based on the first information;
scramble a Physical Uplink Shared Channel (PUSCH) based on the initialization information; and
send the scrambled PUSCH to the network device based on the initialization information,
wherein the first information comprises a preamble index; and the processor is further configured to:
determine the initialization information for scrambling based on a fourth parameter, a second parameter, and the preamble index, the fourth parameter corresponding a Radio Network Temporary Identity (RNTI) associated with PUSCH transmission, and the second parameter being a specific value e, wherein the specific value of the second parameter is within a first preset value range under a condition of satisfying a first preset condition, and corresponds to a cell identifier under a condition of not satisfying the first preset condition; and a maximum value within the first preset value range is 1023.

20. The terminal according to claim 19, wherein the processor is further configured to:
directly determine the initialization information for scrambling based on the fourth parameter, the second parameter, and the preamble index.

* * * * *